US010470022B2

(12) United States Patent
Yamada

(10) Patent No.: US 10,470,022 B2
(45) Date of Patent: *Nov. 5, 2019

(54) INFORMATION PROCESSING PROGRAM PRODUCT, INFORMATION PROCESSING APPARATUS, AND INFORMATION PROCESSING SYSTEM

(71) Applicant: RICOH COMPANY, LTD., Tokyo (JP)

(72) Inventor: Tsuyoshi Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,691

(22) Filed: Aug. 1, 2018

(65) Prior Publication Data
US 2018/0352407 A1 Dec. 6, 2018

Related U.S. Application Data

(63) Continuation of application No. 15/312,389, filed as application No. PCT/JP2015/068594 on Jun. 22, 2015, now Pat. No. 10,080,123.

(30) Foreign Application Priority Data

Jun. 26, 2014 (JP) ................................ 2014-130950
Feb. 20, 2015 (JP) ................................ 2015-032198

(51) Int. Cl.
H04B 5/00 (2006.01)
H04M 1/00 (2006.01)
(Continued)

(52) U.S. Cl.
CPC ............. *H04W 4/80* (2018.02); *H04W 72/10* (2013.01); *H04W 76/18* (2018.02); *H04W 76/16* (2018.02)

(58) Field of Classification Search
CPC ....... H04W 4/008; H04W 4/80; H04W 36/14; H04W 48/18; H04W 76/02;
(Continued)

(56) References Cited

U.S. PATENT DOCUMENTS 6,453,172 B1 9/2002 Miyashita
7,239,890 B2 7/2007 Kitami et al.
(Continued)

FOREIGN PATENT DOCUMENTS

JP 5121212 1/2013
JP 2013-187566 9/2013
(Continued)

OTHER PUBLICATIONS

International Search Report dated Sep. 15, 2015 in PCT/JP2015/068594 filed on Jun. 22, 2015.
(Continued)

Primary Examiner — Quochien B Vuong
(74) Attorney, Agent, or Firm — Oblon, McClelland, Maier & Neustadt, L.L.P.

(57) ABSTRACT

An information processing apparatus includes an acquisition unit that acquires first communication information for connecting with an apparatus via a first network and second communication information for connecting with the apparatus via a second network, a determination unit that determines whether communication between an information processing apparatus and the apparatus via the first network based on the first communication information is possible, a connection unit that connects the information processing apparatus with the apparatus via the second network based on the second communication information when the communication via the first network is impossible, and a request unit that transmits a processing request to the apparatus via the first network when the communication via the first
(Continued)

network is possible, and transmits the processing request to the apparatus via the second network when the information processing apparatus is connected with the apparatus via the second network.

17 Claims, 16 Drawing Sheets

(51) Int. Cl.
*H04W 4/80* (2018.01)
*H04W 76/18* (2018.01)
*H04W 72/10* (2009.01)
*H04W 76/16* (2018.01)

(58) Field of Classification Search
CPC ... H04W 76/027; H04W 76/10; H04W 84/12; H04W 88/10; H04B 1/3816; H04B 1/401
USPC ............... 455/41.1, 41.2, 41.3, 552.1, 553.1
See application file for complete search history.

(56) References Cited

U.S. PATENT DOCUMENTS

| | | | |
|---|---|---|---|
| 7,587,201 B2 * | 9/2009 | Ohara | H04L 41/0806 455/423 |
| 7,660,283 B2 | 2/2010 | Kaneko | |
| 8,335,489 B2 | 12/2012 | Hamada | |
| 9,100,774 B2 | 8/2015 | Suzuki et al. | |
| 9,270,656 B2 | 2/2016 | Kuwabara | |
| 2008/0101365 A1 | 5/2008 | Dodd | |
| 2010/0061355 A1 * | 3/2010 | Tsuchiya | H04W 4/20 370/338 |
| 2012/0278452 A1 | 11/2012 | Schmitz et al. | |
| 2013/0229685 A1 | 9/2013 | Naruse | |
| 2013/0260683 A1 | 10/2013 | Suzuki et al. | |
| 2013/0312062 A1 | 11/2013 | Kuwabara | |
| 2014/0068020 A1 | 3/2014 | Kim et al. | |
| 2015/0082222 A1 | 3/2015 | Yamada | |
| 2015/0212769 A1 | 7/2015 | Norota et al. | |
| 2016/0381729 A1 * | 12/2016 | Lee | H04W 76/18 370/310 |
| 2018/0206291 A1 * | 7/2018 | Takeuchi | H04W 88/06 |

FOREIGN PATENT DOCUMENTS

| | | |
|---|---|---|
| JP | 2014-027384 | 2/2014 |
| JP | 2015-159533 | 9/2015 |

OTHER PUBLICATIONS

Written Opinion of the International Preliminary Examining Authority dated Feb. 9, 2016 in PCT/JP2015/068594 filed on Jun. 22, 2015.
European search report dated May 18, 2017 in corresponding European patent application No. 15812841.3.
Aug. 28, 2018 Japanese official action (including machine translation obtained from Global Dossier) in connection with corresponding Japanese patent application No. JP2015-032198.

* cited by examiner

FIG.6

| ITEM NAME | ITEM VALUE | |
|---|---|---|
| 1ST IP ADDRESS | 192.168.20.1 | } 1100 |
| SSL COMMUNICATION | YES | |
| ... | | |
| USE PROPRIETY OF NETWORK N2 | YES | } 1200 |
| 2ND IP ADDRESS | 192.160.0.3 | |
| SSID | 123ABC | |
| ENCRYPTION | WPA/WPA2-PSK | |
| PASSWORD | ****** | } 1300 |
| HTTP PORT NUMBER | 80 | |
| HTTPS PORT NUMBER | 443 | |
| ... | | |

FIG.11

| PRIORITY | ITEM NAME | ITEM VALUE | |
|---|---|---|---|
| 1 | 1ST IP ADDRESS | 192.168.20.1 | } 1100 |
| | SSL COMMUNICATION | YES | |
| | ... | | |
| 3 | USE PROPRIETY OF NETWORK N2 | YES | } 1200 |
| | 2ND IP ADDRESS | 192.160.0.3 | } 1300 |
| | SSID | 123ABC | |
| | ENCRYPTION | WPA/WPA2-PSK | |
| | PASSWORD | ****** | |
| | HTTP PORT NUMBER | 80 | |
| | HTTPS PORT NUMBER | 443 | |
| | ... | | |
| 2 | USE PROPRIETY OF NETWORK N3 | YES | } 1400 |
| | 3RD IP ADDRESS | 192.160.10.1 | } 1500 |
| | SSID | 983XYZ | |
| | ENCRYPTION | WPA/WPA2-PSK | |
| | PASSWORD | ****** | |
| | HTTP PORT NUMBER | 80 | |
| | HTTPS PORT NUMBER | 443 | |
| | ... | | |

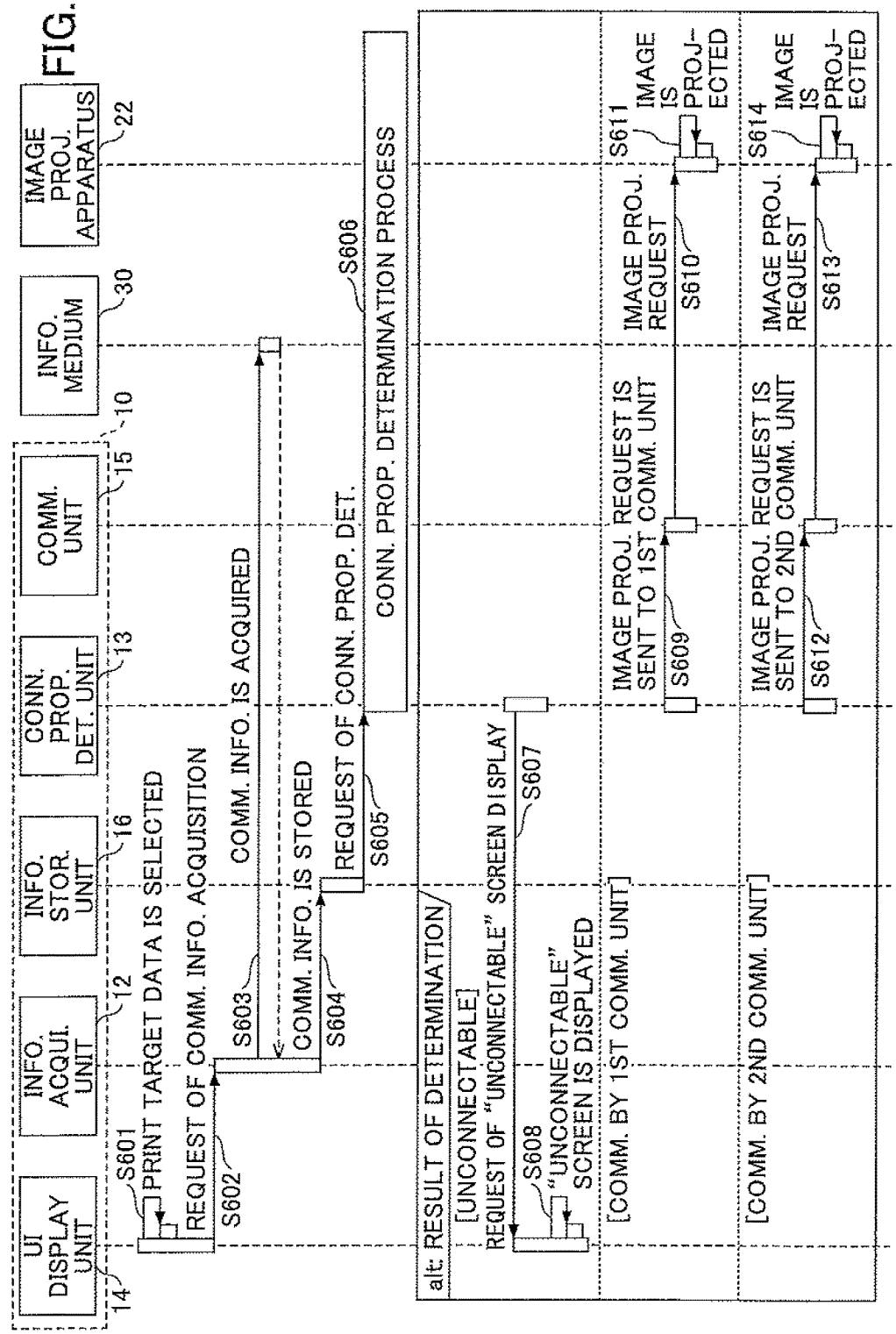

INFORMATION PROCESSING PROGRAM PRODUCT, INFORMATION PROCESSING APPARATUS, AND INFORMATION PROCESSING SYSTEM

CROSS-REFERENCE TO RELATED APPLICATIONS

This application is a Rule 1.53(b) continuation of U.S. patent application Ser. No. 15/312,389 filed Nov. 18, 2016 as a Section 371 national stage of PCT/JP2015/068594 filed Jun. 22, 2015 claiming the priority of Japanese patent applications nos. 2014-130950 and 2015-032198 filed with the Japan Patent Office on Jun. 26, 2014 and Feb. 20, 2015, respectively, the entire disclosure of each of which is hereby incorporated by reference herein.

TECHNICAL FIELD

The present invention relates to an information processing program product, an information processing apparatus, and an information processing system.

BACKGROUND ART

If a user having a mobile terminal can utilize a function of a remote apparatus, such as an image forming apparatus, through wireless communication between the terminal and the apparatus, it is convenient for the user and there is no need to connect the terminal and the apparatus by wire. However, in many cases, setting of wireless communication parameters is required in order to perform wireless communication between the terminal and the apparatus, and the setting of wireless communication parameters to the apparatus is not necessarily an easy operation.

For this reason, a proposed method of setting wireless communication parameters to a mobile terminal which does not require user's setting operation or minimizes user's setting effort is known in the art. For example, see Japanese Patent No. 5121212. Japanese Patent No. 5121212 discloses a management device which reads stored information from a user's NFC (near field communication) chip so as to enable a radio communication device (mobile terminal) to connect with a same apparatus (router, server) by using different wireless communication parameters. This management device sets in the radio communication device wireless communication parameters for a home network or wireless communication parameters for a visited network based on the read information.

SUMMARY OF THE INVENTION

However, in the method of setting the wireless communication parameters disclosed in Japanese Patent No. 5121212, it is difficult for the user to determine which of the wireless communication parameters are to be selected as being set in the radio communication device.

For example, when the image forming apparatus is connected to both an employee-oriented network for employees and a visitor-oriented network for visitors, if the wireless communication parameters for each of the visitor-oriented network and the employee-oriented network are stored in the NFC chip, the mobile terminal carried by the user is able to read the wireless communication parameters for the desired one of the two networks from the NFC chip and set the read wireless communication parameters in the terminal.

However, connecting a visitor's terminal to the employee-oriented network is usually inhibited, and the employee-oriented network is protected from being accessed by an outsider. An employee's terminal is required to communicate with the image forming apparatus via the employee-oriented network rather than via the visitor-oriented network. Namely, a user's terminal is required to communicate with the image forming apparatus via an appropriate network. However, in many cases, even if the wireless communication parameters may be acquired at the terminal, there is a need for the user to determine which of the wireless communication parameters for the two networks are to be selected. In many cases, determining which of the wireless communication parameters are to be selected is difficult for the user.

Means for Solving the Problems

In one aspect, the present invention provides an information processing program product that enables an information processing apparatus to transmit a request to an apparatus which is connectable with two or more networks, without the need for a user to select a network from the networks.

In one embodiment, the present invention provides an information processing program product including a non-transitory computer-readable medium having a program recorded thereon that is executable by a processor of an information processing apparatus, the processor being configured to transmit a processing request to an apparatus via one of plural networks, including a first network and a second network, with which the apparatus is connectable, the program when executed causing the processor to implement functions of: an acquisition unit configured to acquire first communication information for connecting with the apparatus via the first network and second communication information for connecting with the apparatus via the second network; a determination unit configured to determine whether communication between the information processing apparatus and the apparatus via the first network based on the first communication information is possible; a connection unit configured to connect the information processing apparatus with the apparatus via the second network based on the second communication information when the communication via the first network is determined as being impossible; and a request unit configured to transmit the processing request to the apparatus via the first network when the communication via the first network is determined as being possible, and transmit the processing request to the apparatus via the second network when the information processing apparatus is connected with the apparatus via the second network.

Other objects, features and advantages of embodiments will be apparent from the following detailed description when read in conjunction with the accompanying drawings.

BRIEF DESCRIPTION OF THE DRAWINGS

FIG. 6 is a diagram showing an example of communication information.

FIG. 11 is a diagram showing another example of communication information.

FIG. 14 is a sequence diagram for explaining an image projection process performed by the image projection system according to the second embodiment.

MODE FOR CARRYING OUT THE INVENTION

A description will be given of embodiments with reference to the accompanying drawings.

Figure 1A:
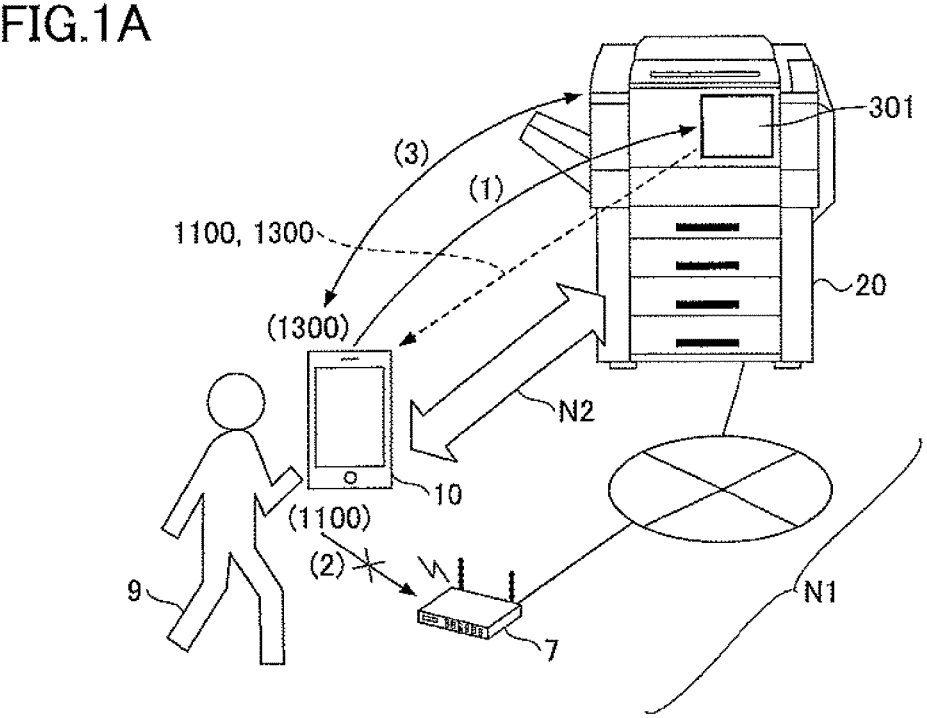
FIG. 1A and FIG. 1B are diagrams for explaining use cases which are assumed for a printing system according to a first embodiment.
Figure 1B:
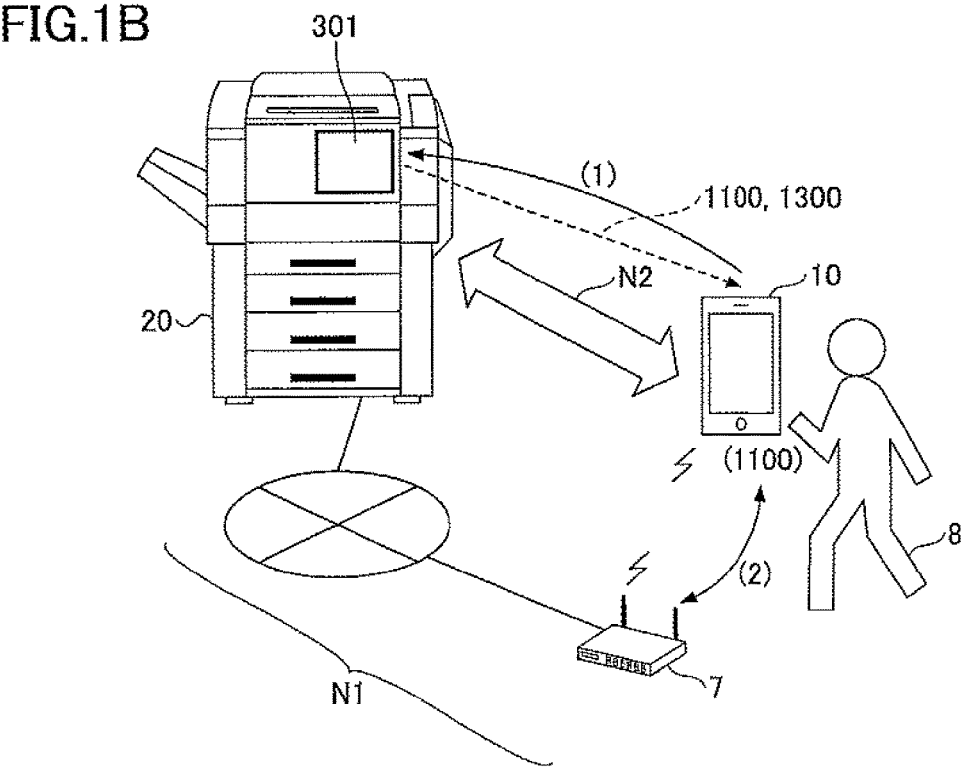

First, use cases which are assumed for a printing system 1 according to a first embodiment will be described with reference to FIG. 1A and FIG. 1B. FIG. 1A and FIG. 1B are diagrams for explaining use cases which are assumed for the printing system 1 according to the first embodiment. An image forming apparatus 20 is connected to a network N1 which is equivalent to an in-company LAN or the like, and an access point 7 is connected to the network N1. The image forming apparatus 20 is further configured to perform P2P (peer to peer) communication via a network N2.

Use case 1, shown in FIG. 1A, is a case in which a visitor 9 performs wireless communication with the image forming apparatus 20 for a print job using his own mobile terminal 10.

(1) The visitor 9 carrying the mobile terminal 10 approaches an NFC (near-field communication) device 301 which is provided on or near the image forming apparatus 20. This enables the mobile terminal 10 to acquire from the NFC device 301 first communication information 1100 for communicating with the image forming apparatus 20 via the network N1 and second communication information 1300 for communicating with the image forming apparatus 20 via the network N2.

(2) The mobile terminal 10 attempts to communicate with the image forming apparatus 20 using the first communication information 1100. However, the mobile terminal 10 of the visitor 9 cannot be connected to the in-company LAN (network N1) using the first communication information 1100.

(3) The mobile terminal 10 attempts to communicate with the image forming apparatus using the second communication information 1300. The mobile terminal 10 of the visitor 9 can be connected to the in-company LAN using the second communication information, and the communication between the mobile terminal 10 and the image forming apparatus 20 via the network N2 is started.

Hence, the mobile terminal 10 of the visitor 9 can communicate with the image forming apparatus 20 via the network N2 without using the network N1 (or the in-company LAN).

Use case 2, shown in FIG. 1B, is a case in which an employee 8 performs wireless communication with an image forming apparatus 20 for a print job using his own mobile terminal 10, the image forming apparatus 20 being arranged in a company section not pertinent to the employee 8 and not in regular use by the employee 8.

(1) The employee 8 carrying the mobile terminal 10 approaches the NFC device 301 which is provided on or near the image forming apparatus 20. This enables the mobile terminal 10 to acquire from the NFC device 301 first communication information 1100 for communicating with the image forming apparatus 20 via the network N1 and second communication information 1300 for communicating with the image forming apparatus 20 via the network N2.

(2) The employee 8 has the authority to connect with the in-company LAN of his company, and the wireless communication parameters for connecting with the access point 7 are set in the mobile terminal 10 of the employee 8. If the mobile terminal 10 attempts to communicate with the image forming apparatus 20 using the first communication information 1100, the mobile terminal 10 can connect with the in-company LAN (the network N1). By using the first communication information 1100, the mobile terminal 10 can communicate with the image forming apparatus 20 via the network N1. The communication between the mobile terminal 10 and the image forming apparatus 20 via the network N1 is started.

Hence, the mobile terminal 10 of the employee 8 can communicate with the image forming apparatus 20 via the network N1 (or the in-company LAN). Even if the mobile terminal 10 of the employee 8 cannot connect with the image forming apparatus 20 via the network N1 for a certain reason, the mobile terminal 10 of the employee 8 is capable of communicating with the image forming apparatus 20 via the network N2. In such a case, the employee 8 can request the image forming apparatus 20 to perform a print job.

Thus, the printing system 1 according to the first embodiment reduces the user's setting effort in setting up the communication information and enables the automatic selection of an appropriate network for the users, including the visitor 9 and the employee 8.

In the following, the employee 8 is an example of users of the mobile terminal 10 and the image forming apparatus 20, and the employee 8 has the authority to connect with the in-company LAN (the wireless communication parameters for connecting with the in-company LAN are set in the mobile terminal 10). The user of this type is not limited to the employee 8 and may also be referred to as a person, a company staffer, a staff member, etc.

In the following, the visitor 9 is an example of users of the mobile terminal 10 and the image forming apparatus 20, and the visitor 9 has no authority to connect with the in-company LAN. Users other than the employee 8 may be classified as the visitor 9.

[First Embodiment]

Figure 2:
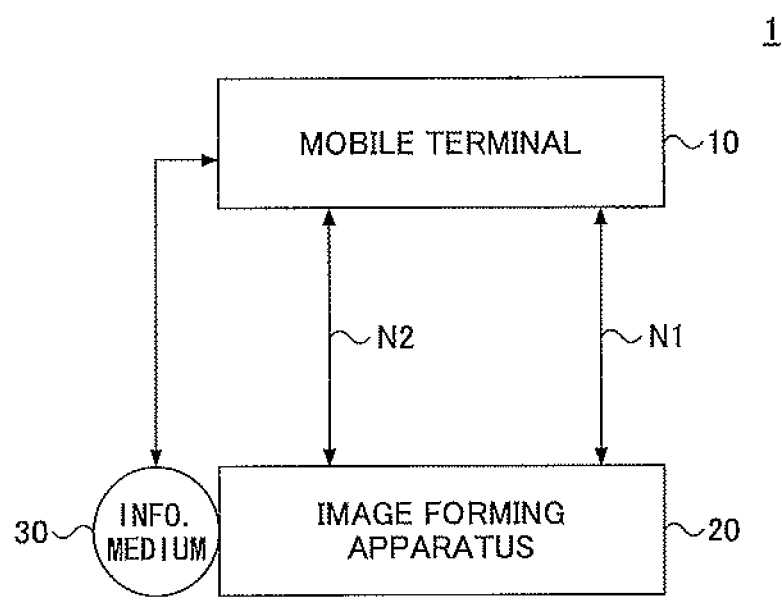
FIG. 2 is a diagram showing a configuration of the printing system according to the first embodiment.

A configuration of the printing system 1 according to a first embodiment is described with reference to FIG. 2. FIG. 2 is a diagram showing a configuration of the printing system 1 according to the first embodiment.

As shown in FIG. 2, the printing system 1 may include a mobile terminal 10 and one or more image forming apparatuses 20. Although not illustrated in FIG. 2, the printing system 1 may include two or more image forming apparatuses 20. The mobile terminal 10 and the image forming apparatus 20 may be connected by a cable or radio via the network N1 or the network N2.

Since the mobile terminal 10 is an information processing apparatus that can be carried by a user as described later, it is preferred that the mobile terminal 10 and the image forming apparatus 20 are connectable with each other by radio via the network N1 or the network N2. The term "connectable" means that both the mobile terminal 10 and the image forming apparatus 20 have a connection function, and the determination as to whether they are actually connectable with each other is made by a connection propriety determination process which will be described later with reference to FIG. 7 or FIG. 8.

When the mobile terminal 10 is carried by the visitor 9, the mobile terminal 10 remains disconnected from the network N1 and is connectable with the network N2 upon a request. The employee 8 has the authority to connect with the network N1 (the in-company LAN). Hence, when the mobile terminal 10 is carried by the employee 8, an SSID (service set identifier) and a password (an encryption key) are set in the mobile terminal 10 as the wireless communication parameters, and so the mobile terminal 10 is connectable with the network N1. Hence, if the IP address of the image forming apparatus 20 is detected, the mobile terminal 10 carried by the employee 8 is able to communicate with the image forming apparatus 20.

In the following, it is assumed that the network N1 is a wireless LAN (local area network), such as in-company LAN, for connecting the mobile terminal 10 with the image forming apparatus 20 by radio, and the network N2 is a network for connecting the mobile terminal 10 with the image forming apparatus 20 directly by P2P communication in Wi-Fi direct mode. However, the network N1 and the network N2 are not limited to these examples. For example, the network N1 may include a WAN (wide area network) and the Internet, in addition to the in-company LAN, and may include partially a mobile phone communication network. For example, the network N2 may be a network for connecting the mobile terminal 10 with the image forming apparatus 20 through the ad hoc mode of a wireless LAN, a mobile phone communication network, infrared communication, Bluetooth®, etc. In other words, the network N2 may be a network adapted to prevent an outsider from accessing the in-company resources, like the in-company LAN. Moreover, the network N2 may be an in-company LAN for connecting the mobile terminal 10 with the image forming apparatus 20 via a wireless LAN, if the network N2 is appropriately set up to be separated from the network N1 (for example, the network N2 has a network address different from that of the network N1).

In the printing system 1 shown in FIG. 2, an information medium 30 is attached to a housing (external surface) of the image forming apparatus 20. Hence, the mobile terminal 10 and the information medium 30 can communicate with each other by near-field communication.

The mobile terminal 10 is a portable information processing apparatus, such as a smart phone, which is operated by a user. Examples of the mobile terminal 10 may include a smart phone, a mobile phone, a tablet terminal, a game machine, a PDA (personal digital assistant), a digital camera, a wearable PC, a notebook PC, etc. An application executable by a processor is installed in the mobile terminal 10, and the application when executed causes the processor of the mobile terminal 10 to send a function provision request (e.g., a printing command of printing target data, a document scanning request, a facsimile transmission request, a copying request) from the mobile terminal 10 to the image forming apparatus 20. The application when executed causes the processor of the mobile terminal 10 to generate any one of a print job (including the printing target data associated with the printing command), a scan job, a FAX transmission job, a copy job, etc., and transmit the same to the image forming apparatus 20.

Moreover, the mobile terminal 10 includes a NFC (near-field communication) device, such as a NFC chip, which will be described later. A user may acquire two or more communication information items, including an IP address for communicating with the image forming apparatus 20, by holding the mobile terminal 10 to the information medium 30 which is attached to the housing of the image forming apparatus 20 at a predetermined position thereof. The mobile terminal 10 may transmit a generated print job to the image forming apparatus 20 based on the acquired communication information, so that the print job may be executed by the image forming apparatus 20 to output a copy of the printing target data.

The application installed in the mobile terminal 10 may be a software module, such as a browser, a document preparation program, or a viewer, which is configured to communicate with the image forming apparatus 20 and send a job execution request to the image forming apparatus 20.

The image forming apparatus 20 may be an apparatus, such as a printer, which receives a print job or the like from the mobile terminal 10 and outputs a copy of the printing target data. The image forming apparatus 20 may be an MFP (multifunction peripheral) which has multiple functions including a copy function, a scan function, a facsimile function, a print function, etc.

Alternatively, the image forming apparatus 20 may be any of a scanner device, a facsimile machine, an audio output device such as a loudspeaker, an image projection apparatus (projector), a rear projection apparatus, a HUD (head-up display) apparatus, an electronic whiteboard, or a digital signage device. In the present embodiment, the printing system 1 has been described as an example of an information processing system. However, the information processing system according to the invention is not limited to the above example and may be an audio output system in which a loudspeaker device is used instead of the image forming apparatus 20, or an image output system in which an image output device is used instead of the image forming apparatus 20. Namely, the information processing system according to the invention is applicable to various systems including a mobile terminal 10 to generate various kinds of jobs, images, and data that may be transformed into images, and an apparatus (which is the image forming apparatus 20 according to the first embodiment) to output the jobs, the images, and the data that can be transformed into images received from the mobile terminal 10. Moreover, the information processing system according to the invention may be configured to merely carry out wireless communication between the mobile terminal 10 and the apparatus without outputting data.

The information medium 30 may include an NFC (near-field communication) device, such as an NFC chip, which is attached to the housing of the image forming apparatus 20 at a predetermined position thereof. For example, the information medium 30 may be an NFC tag or the like. Communication information including an IP address of the image forming apparatus 20 to which the information medium 30 is attached is stored in the information medium 30. More specifically, communication information needed for the mobile terminal 10 to communicate with the image forming apparatus 20 via the network N1 and communication information needed for the mobile terminal 10 to communicate with the image forming apparatus 20 via the network N2 are stored in the information medium 30. Namely, a plurality of communication information items with respect to a corresponding number of networks by which the mobile terminal 10 and the image forming apparatus 20 are connectable with each other may be stored in the information medium 30.

The mobile terminal 10 may acquire the stored communication information from the information medium 30 through near-field communication. As described above, the mobile terminal 10 may transmit a print job to the image forming apparatus 20 based on the communication information acquired from the information medium 30, so that the print job may be executed by the image forming apparatus 20.

The information medium 30 storing the communication information to be transmitted to the mobile terminal 10 is not limited to the NFC tag. For example, if the communication information is stored in the image forming apparatus, the communication information may be transmitted from the image forming apparatus directly to the mobile terminal 10 by using another communication process, such as Bluetooth® or infrared communication, which does not require a destination address. In this case, however, the mobile terminal 10 is required to have a corresponding function (Bluetooth® or infrared communication).

In the above-described printing system 1, the mobile terminal 10 and the image forming apparatus 20 are configured to be connectable with each other via the two networks, the network N1 and the network N2. Alternatively, the mobile terminal 10 and the image forming apparatus 20 may be configured to be connectable with each other via three or more networks.

In addition, the above-described printing system 1 may be configured to include a print server which accumulates print jobs received from the mobile terminal 10. Furthermore, the above-described printing system 1 may be configured to include one or more mobile terminals 10.

Figure 3:
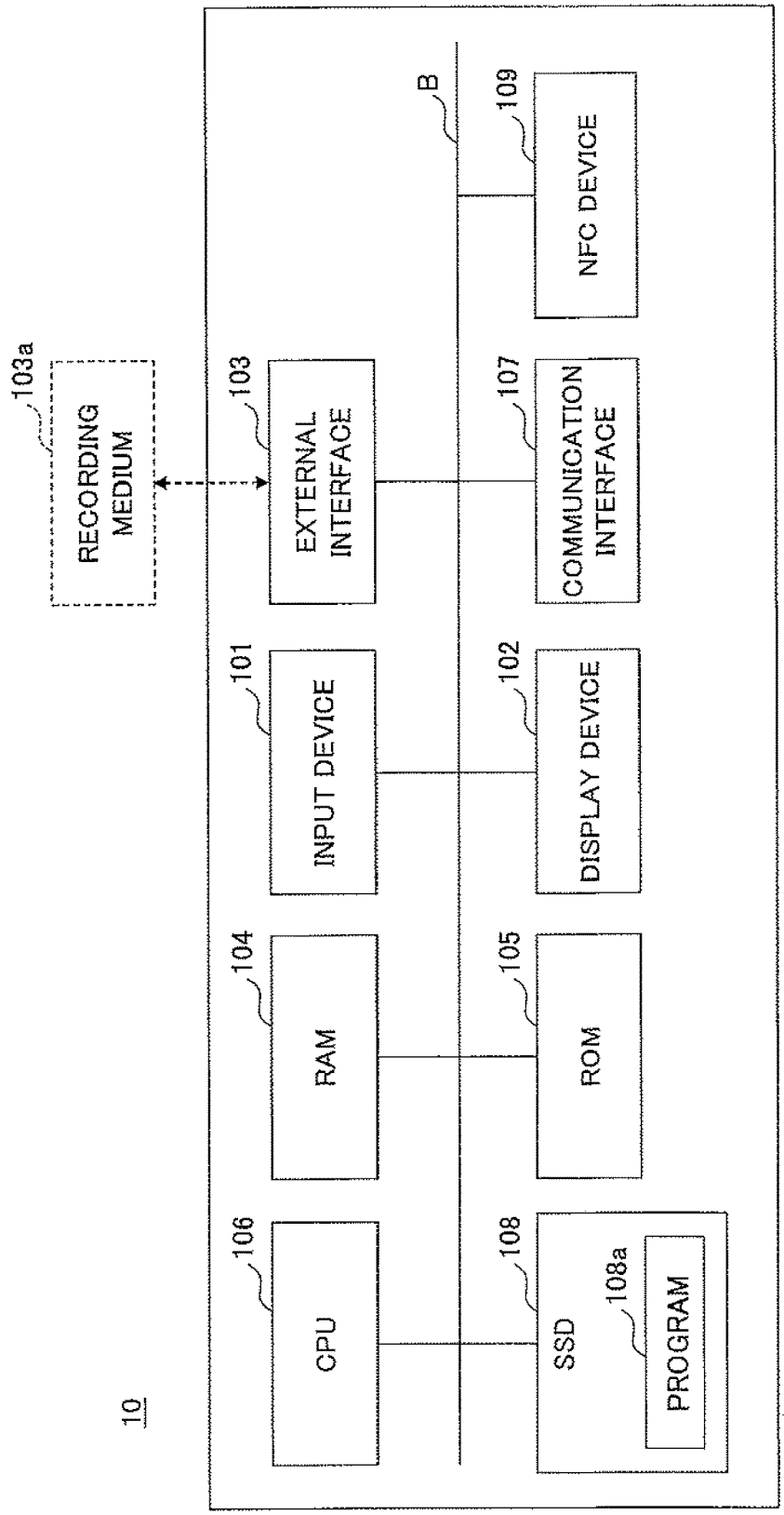
FIG. 3 is a diagram showing a hardware configuration of a mobile terminal.

The mobile terminal 10 according to the first embodiment is implemented by a hardware configuration as shown in FIG. 3. FIG. 3 is a diagram showing a hardware configuration of the mobile terminal 10 according to the first embodiment. As shown in FIG. 3, the mobile terminal 10 may include an input device 101, a display device 102, an external interface 103, a RAM (random access memory) 104, a ROM (read-only memory) 105, a CPU (central processing unit) 106, a communication interface 107, an SSD (solid state drive) 108, and an NFC (near-field communication) device 109. These components of the mobile terminal 10 are interconnected by a bus B.

The input device 101 may include a touch panel, and this touch panel is used to input various signals to the mobile terminal 10. The input devices 101 may include a keyboard, a mouse, etc. The display device 102 may include an LCD (liquid crystal display), and this LCD is used to display a processing result by the mobile terminal 10.

The external interface 103 may provide an interface for connecting the mobile terminal 10 with an external device. The external device may include a recording medium 103a. An information processing program used to implement the mobile terminal 10 according to the first embodiment may be stored in the recording medium 103a. The mobile terminal 10 is configured to read data from and write data to the recording medium 103a via the external interface 103.

The recording medium 103a may be any of various types of recording media, including an SD memory card, a USB (universal serial bus) memory, a DVD (digital versatile disk), a CD (compact disk), and a flexible disk.

The RAM 104 may be a volatile semiconductor memory (storage device) which temporarily stores programs and data. The ROM 105 may be a nonvolatile semiconductor memory (storage apparatus) which can store programs and data even after power-down. The programs and data stored in the ROM 105 may include a BIOS (basic input/output system) which is executed upon a startup of the mobile terminal 10, the OS setting, the network setting, etc.

The CPU 106 may be a processor which controls the entire mobile terminal 10 and implements the functions thereof by reading out the programs and data from the memory, such as the ROM 105 or the SSD 108, to the RAM 104 and executing the same to perform a process.

The communication interface 107 may provide an interface which connects the mobile terminal 10 with the network N1 and the network N2 for performing communication. For example, the communication interface 107 may provide an interface for connecting the mobile terminal 10 with an in-company LAN via a wireless LAN. Moreover, the communication interface 107 may provide an interface for connecting the mobile terminal 10 with the image forming apparatus 20 through P2P communication in Wi-Fi direct mode. Hence, the mobile terminal 10 is capable of performing data communication through the communication interface 107. In addition, the communication interface 107 may provide an interface for accessing a mobile phone communication network, the Internet, etc.

The SSD 108 may be a nonvolatile memory which stores a program 108a and data. The program 108a and data stored in the SSD 108 may include an OS (operating system) as system software to control the entire mobile terminal 10, and application programs (which will also be called applications) which are executed on the OS to offer various functions of the mobile terminal 10. In the SSD 108, the programs and data stored therein are managed by using a predetermined file system and/or database. In addition, the mobile terminal 10 may include an HDD (hard disk drive) instead of the SSD 108 or in addition to the SSD 108.

The NFC device 109 may be an NFC chip. Hence, the mobile terminal 10 is capable of performing data communication through the NFC device 109.

By using the above-described hardware configuration, the mobile terminal 10 according to the first embodiment performs various processes which will be described later.

Figure 4:
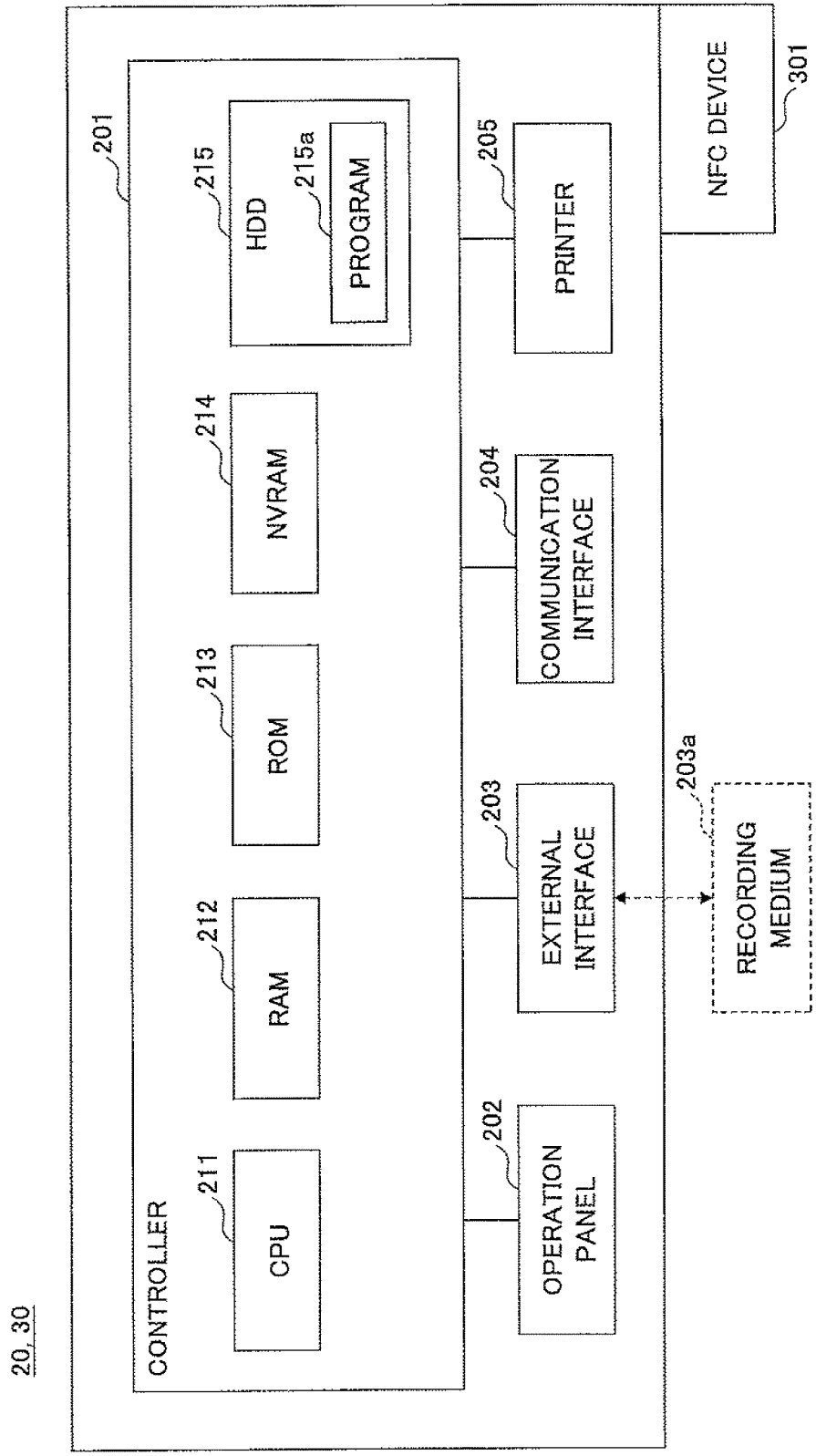
FIG. 4 is a diagram showing a hardware configuration of an image forming apparatus and an information medium.

The image forming apparatus 20 and the information medium 30 according to the first embodiment are implemented by a hardware configuration as shown in FIG. 4. FIG. 4 is a diagram showing a hardware configuration of the image forming apparatus 20 and the information medium 30 according to the first embodiment. As shown in FIG. 4, the image forming apparatus 20 may include a controller 201, an operation panel 202, an external interface 203, a communication interface 204, and a printer 205. Moreover, an NFC (near-field communication) device 301 may be attached to the external surface (housing) of the image forming apparatus 20 as a configuration which implements the information medium 30.

The controller 201 may include a CPU 211, a RAM 212, a ROM 213, an NVRAM 214, and a HDD 215. The ROM 213 stores various programs and data. The RAM 212 temporarily stores programs and data. The NVRAM 214 stores setting information and others. The HDD 215 stores a program 215a and data.

The CPU 211 may be a processor which controls the entire image forming apparatus 20 and implements the functions thereof by reading out the program 215a, the data, and the setting information from the memory, such as the ROM 213, the NVRAM 214 or the HDD 215, to the RAM 212 and executing the program to perform a process.

The operation panel 202 may include an input unit to receive inputs from a user, and a display unit to display results of processes performed by the CPU 211. The external interface 203 may provide an interface for connecting the image forming apparatus 20 with an external device. The external device may be a recording medium 203a or the like. Hence, the image forming apparatus 20 is capable of reading data from and/or writing data to the recording medium 203a through the external interface 203. Examples of the recording medium 203a may include a flexible disk, a CD, a DVD, an SD memory card, a USB memory, etc.

The communication interface 204 may provide an interface for connecting the image forming apparatus 20 with the network N1 and the network N2. Hence, the image forming apparatus 20 is capable of performing data communication through the communication interface 204. The printer 205 may be a printer for printing and outputting a copy of printing target data.

The NEC device 301 may be an NFC chip or the like. The information medium 30 is implemented by a nonvolatile memory of the NEC device 301. If the NFC device 109 of the mobile terminal 10 approaching to the NFC device 301 is detected, the NFC device 301 is capable of communicating with the NFC device 109, reading the stored information from the information medium 30, and transmitting the read information to the mobile terminal 10. The NEC device 301 is provided on or near the image forming apparatus 20. For example, an NFC chip may be attached to the housing of the image forming apparatus 20 at the predetermined position thereof. In this case, it is preferred that the NFC chip is attached to a position where near-field communication between the image forming apparatus 20 and the mobile terminal 10 can be readily performed. The information stored in the information medium 30 may be rewritten by a user using a reader and writer.

Alternatively, the NFC device 301 may be provided inside the image forming apparatus 20 at a position where near-field communication between the image forming apparatus 20 and the mobile terminal 10 can be performed, instead of being provided on the external surface of the image forming apparatus 20. Moreover, attaching the NFC device 301 to the image forming apparatus 20 is not necessarily required. For example, the NFC device 301 may be arranged in a vicinity of the image forming apparatus 20 or on a guide plate placed in a path to the image forming apparatus 20.

By using the above-described hardware configuration, the image forming apparatus 20 and the information medium 30 according to the first embodiment perform various processes which will be described later.

Figure 5:
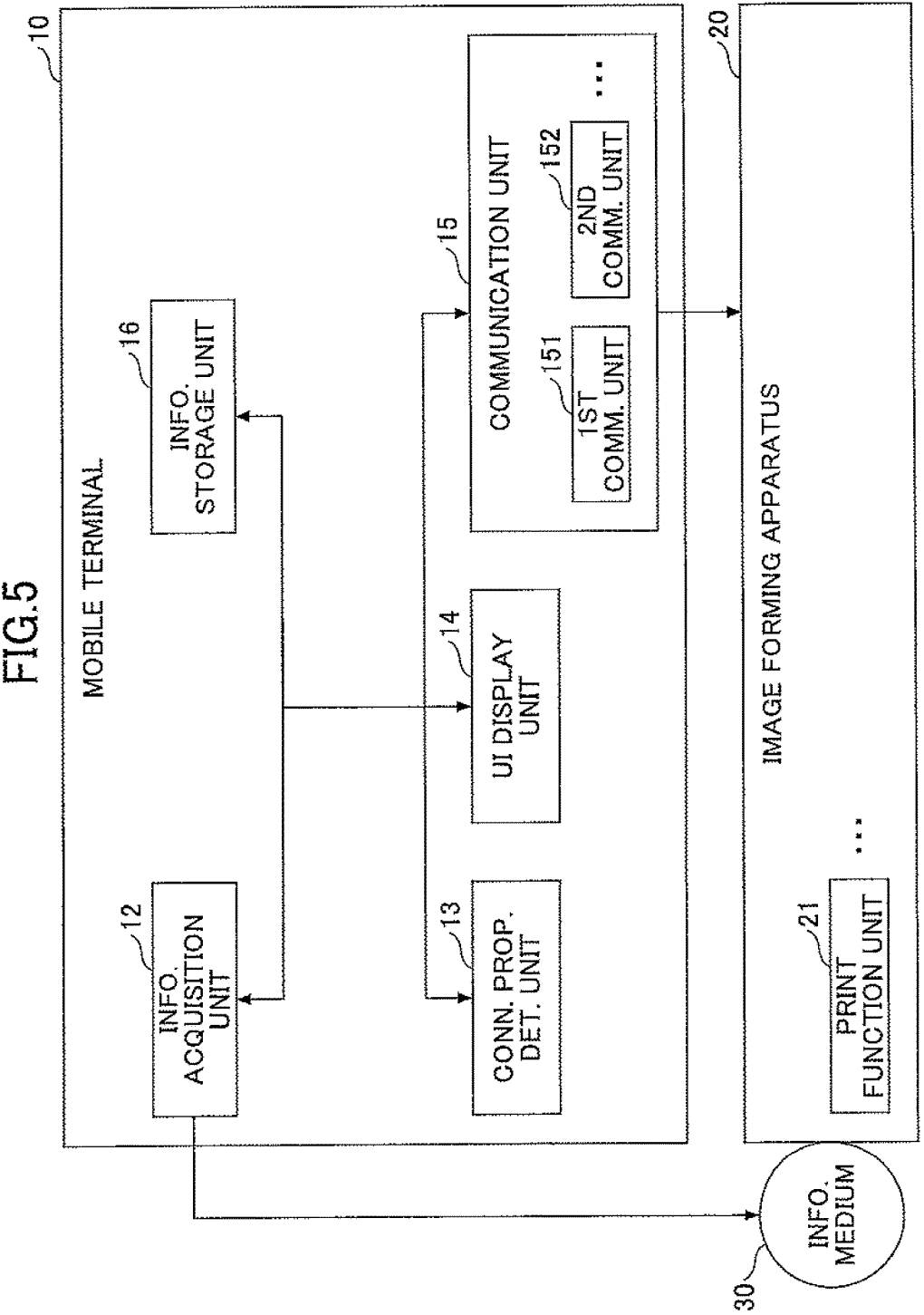
FIG. 5 is a diagram showing a functional configuration of the printing system according to the first embodiment.

The printing system 1 according to the first embodiment may be implemented by a functional configuration as shown in FIG. 5. FIG. 5 is a diagram showing a functional configuration of the printing system according to the first embodiment.

As shown in FIG. 5, the mobile terminal 10 of the printing system 1 may include an information acquisition unit 12, a connection propriety determination unit 13, a UI display unit 14, a communication unit 15, and an information storage unit 16. The communication unit 15 may include a first communication unit 151, a second communication unit 152, etc. On the other hand, the image forming apparatus 20 of the printing system 1 may include a print function unit 21.

The image forming apparatus 20 is capable of receiving a process execution request from two or more networks N1 and N2.

The information acquisition unit 12 may be implemented by the CPU 106, the NFC device 109, etc., and is configured to acquire from the information medium 30 two or more communication information items for communicating with the image forming apparatus 20 through near-field communication.

The connection propriety determination unit 13 may be implemented by the CPU 106, etc., and is configured to determine which of the two or more networks by which the mobile terminal 10 and the image forming apparatus 20 are connectable to each other is to be selected for communication based on the communication information items acquired from the information medium 30. Specifically, the connection propriety determination unit 13 according to the first embodiment is configured to determine which of the network N1 and the network N2 by which the mobile terminal 10 and the image forming apparatus 20 are connectable to each other is to be selected for communication based on the communication information items acquired from the information medium 30.

The UI display unit 14 may be implemented by the CPU 106, the display device 102, etc., and is configured to generate a UI (user interface) screen and display the UI screen.

The communication unit 15 may be implemented by the communication interface 107, etc., and is configured to communicate with the image forming apparatus 20. More specifically, based on the result of the determination by the connection propriety determination unit 13, the first communication unit 151 is configured to communicate with the image forming apparatus 20 via the network N1, and the second communication unit 152 is configured to communicate with the image forming apparatus 20 via the network N2.

The information storage unit 16 may be implemented by the CPU 106, the ROM 105, the SSD 108, etc., and is configured to store communication information 1000 (see FIG. 6) acquired by the information acquisition unit 12 and read out the stored communication information.

The print function unit 21 may be implemented by the printer 205, etc., and is configured to print printing target data included in a print job the execution of which is requested by the mobile terminal 10. In addition to the print function unit 21, the image forming apparatus 20 may further include a scan function unit for generating image data (electronic data) from a read document, a copy function unit for reproducing a read document, a facsimile function unit for performing FAX transmission of a read document or electronic data via a telephone network, etc.

The information medium 30 may be implemented by the NFC device 301 and is configured to store the communication information 1000 for communicating with the image forming apparatus 20 to which the information medium 30 is attached. The information medium 30 is configured to transmit the communication information 1000, stored in the information medium 30, to the mobile terminal 10 through the near-field communication in response to receiving a request from the information acquisition unit 12 of the mobile terminal 10.

The communication information 1000 stored in the information medium 30 is described with reference to FIG. 6. In addition, the communication information 1000 stored in the information storage unit 16 of the mobile terminal 10 is essentially the same as the communication information 1000 stored in the information medium 30. FIG. 6 is a diagram for explaining an example of the communication information 1000.

As shown in FIG. 6, the communication information 1000 includes the first communication information 1100 for communicating with the image forming apparatus 20 via the network N1, use propriety information 1200 indicating the use propriety of communication via the network N2, and the second communication information 1300 for communicating with the image forming apparatus 20 via the network N2. Namely, the communication information 1000 has two or more communication information items, including at least the first communication information 1100 and the second communication information 1300.

The first communication information 1100 is information needed for the mobile terminal 10 to communicate with the image forming apparatus 20 via the network N1 (e.g., an in-company LAN connected via a wireless LAN). The first communication information 1100 may include a first IP address (which is an IP address of the image forming apparatus 20 in the network N1), an SSL (secure sockets layer) communication (which indicates the presence of the SSL communication in the network N1), etc. The first communication information 1100 does not include an SSID or a password for connecting with the in-company LAN from the access point 7. As described above, it is assumed that the employee 8 has the authority to connect with the network N1 and the SSID and the password are set beforehand in the mobile terminal 10 of the employee 8. If an SSID and a password for an in-company LAN should be set in the first communication information 1100, the mobile terminal 10 of the visitor 9 will be allowed to connect with the in-company LAN using the first communication information 1100. Based on the assumption that an SSID and a password are set beforehand in the mobile terminal 10 of the employee 8, only the minimum information item (the IP address) is stored in the first communication information 1100. According to the first embodiment, connecting the visitor 9 with the in-company LAN is inhibited, and connecting the employee 8 with the in-company LAN is permitted. Namely, only the mobile terminal 10 which is currently connected with the in-company LAN is permitted to connect with the image forming apparatus 20 using the first communication information 1100.

When the connection propriety determination unit 13 has determined that the mobile terminal 10 and the image forming apparatus 20 are not connectable with each other via the network N1, the use propriety information 1200 indicates whether communication via the network N2 can be used. For example, in the communication information 1000 shown in FIG. 6, the use propriety information 1200 is set to "YES." Hence, when the connection propriety determination unit 13 has determined that the mobile terminal 10 and the image forming apparatus 20 are not connectable with each other via the network N1, the mobile terminal 10 performs a process to attempt to communicate with the image forming apparatus 20 via the network N2 in the case of the example shown in FIG. 6. On the other hand, when the use propriety information 1200 is set to "NO", the mobile terminal 10 cannot communicate with the image forming apparatus 20 via the network N2.

For example, the use propriety information 1200 may be used for billing control purposes. The service fee of the image forming apparatus 20 may be charged on an as-used basis, such as on a total number of copies basis. For example, when the image forming apparatus 20 is arranged in a company A, regardless of whether an employee 8 of the company A or a visitor 9 to the company A who has used the print function of the image forming apparatus 20, the company A is charged for the service fee. Hence, in a case of the image forming apparatus 20 arranged at a place of the company A where many visitors 9 appear, it is undesirable for the company A to permit the use of the print function by the visitors 9.

On the other hand, in a case of the image forming apparatus 20 arranged in a city office or a library, it is necessary to meet the visitors' demands for using the print function. In this case, a coin mechanism may be attached to the image forming apparatus 20 arranged at a public place, and the use of the print function by the visitor 9 may be permitted in the range of the payment by the visitor 9.

In a case of the image forming apparatus 20 arranged at a place where the use of the print function by the visitors 9 is rare or a billing mechanism is installed, the use of the print function by the visitors 9 may be permitted. Thus, the use propriety information 1200 may be used to control the use propriety of the image forming apparatus 20 by the visitors 9.

In addition, use propriety information of the network N1 may also be included in the first communication information 1100. For example, when the network N1 has a problem on security, such use propriety information may be used to prevent the employee 8 from communicating with the image forming apparatus 20 via the network N1.

The second communication information 1300 is information needed for the mobile terminal 10 to communicate with the image forming apparatus 20 via the network N2 (for example, P2P communication in Wi-Fi direct mode). The second communication information 1300 may include a second IP address (which is an IP address of the image forming apparatus 20 in the network N2), an SSID (service set identifier) (which is used to identify the network N2), an encryption type in the network N2, a password, a HTTP (hypertext transfer protocol) port number of the image forming apparatus 20 when communicating via the network N2, a HTTPS (HTTP over SSL/TLS) port number of the image forming apparatus 20 when communicating via the network N2, etc. When no encryption data is used by the image forming apparatus 20 for communication, the communication is possible even if there is no password.

The above-described information items included in the first communication information 1100 and the second communication information 1300 are an example. Various kinds of information needed to perform communication via the network N1 or the network N2 may be included in the communication information 1000. In the above-described communication information 1000, the first IP address and the second IP address differ from each other. However, the first IP address and the second IP address may be the same.

When the mobile terminal 10 and the image forming apparatus 20 are further connectable with each other via a network N3, the communication information 1000 may further include use propriety information indicating the use propriety of communication via the network N3, and third communication information for communicating with the image forming apparatus 20 via the network N3.

Next, processes performed by the printing system 1 according to the first embodiment will be described.

Figure 7:
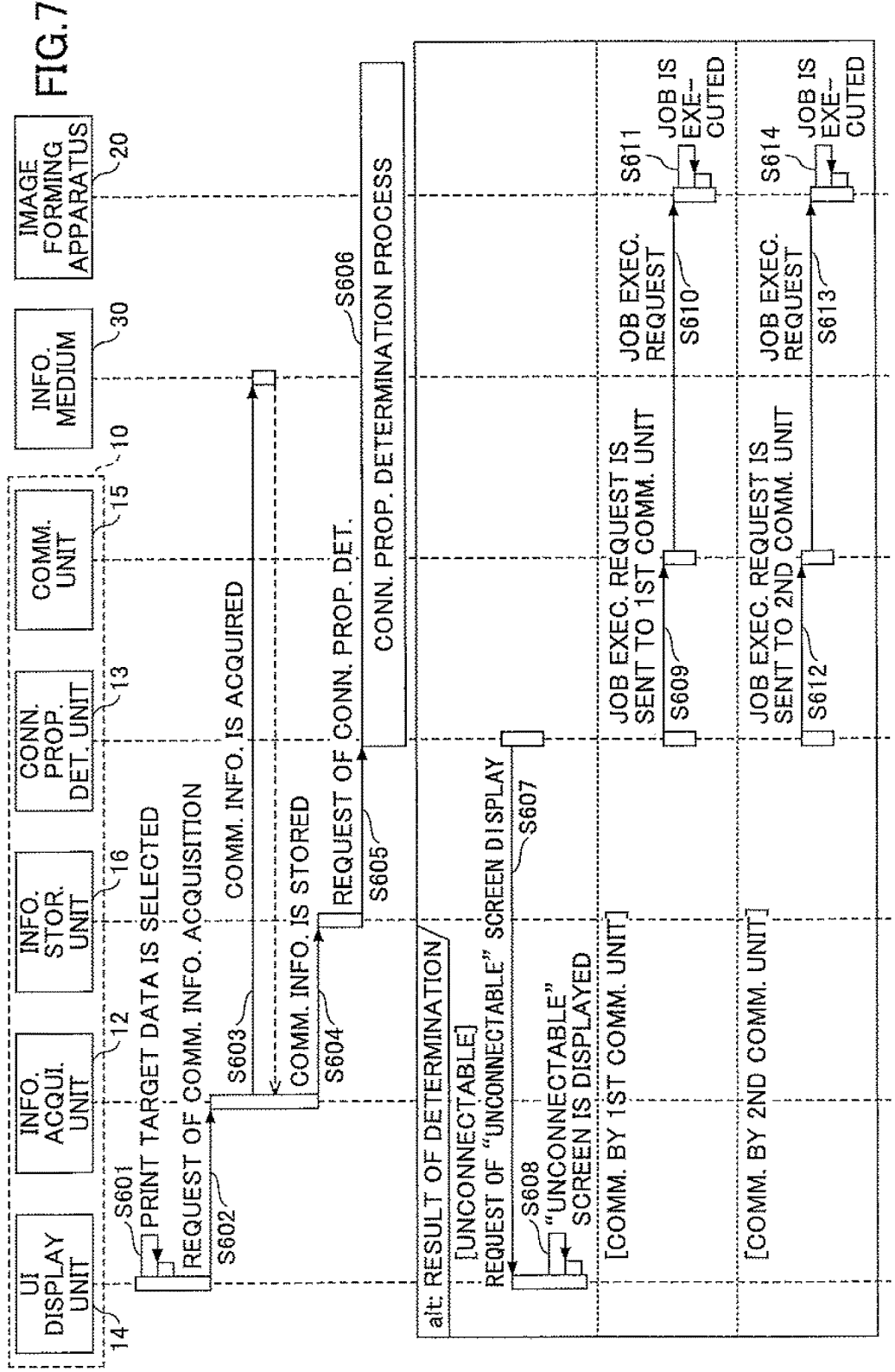
FIG. 7 is a sequence diagram for explaining a print job performed by the printing system according to the first embodiment.

First, a print job performed by the printing system 1 according to the first embodiment is described. FIG. 7 is a sequence diagram for explaining a print job performed by the printing system 1 according to the first embodiment.

As shown in FIG. 7, in step S601, a user selects desired printing target data from an application installed in the mobile terminal 10 through the UI display unit 14 and inputs a printing command. Hence, a print job including the printing target data selected by the user is generated.

In step S602, in response to receiving a notification of execution of the print job, the UI display unit 14 of the mobile terminal 10 sends a request of acquisition of the communication information 1000 to the information acquisition unit 12. The mobile terminal 10 is set in a standby state until a start of the near-field communication by the NFC device 109 is detected. During this period, a screen that prompts the user to hold the mobile terminal 10 close to the information medium 30 (the NFC chip) of the image forming apparatus 20 may be displayed on the display device 102.

After the user holds the mobile terminal 10 close to the information medium 30, in step S603, the information acquisition unit 12 detects a start of the near-field communication between the mobile terminal 10 and the information medium 30 and acquires the communication information 1000 from the information medium 30.

In step S604, the information acquisition unit 12 of the mobile terminal 10 stores the communication information 1000 acquired from the information medium 30 in the information storage unit 16.

In step S605, the information storage unit 16 of the mobile terminal 10 transmits to the connection propriety determination unit 13 a request of determination as to which of the two or more networks is to be selected for communication with the image forming apparatus 20 based on the two or more communication information items included in the communication information 1000.

In step S606, the connection propriety determination unit 13 of the mobile terminal 10 performs a connection propriety determination process. In the first embodiment, the connection propriety determination unit 13 generates one of the following results of determination as a result of the connection propriety determination process. The details of the connection propriety determination process will be described later.

(1) The mobile terminal 10 and the image forming apparatus 20 are not connectable with each other via the network N1 or the network N2 (the result of determination is "unconnectable").

(2) The mobile terminal 10 and the image forming apparatus 20 are connectable with each other via the network N1 (the result of determination is "communication by the first communication unit").

(3) The mobile terminal 10 and the image forming apparatus 20 are connectable with each other via the network N2 (the result of determination is "communication by the second communication unit").

Subsequently, when the result of determination by the connection propriety determination unit 13 is the item (1) above, the UI display unit 14 performs an operation in step S608. When the result of determination by the connection propriety determination unit 13 is the item (2) above, the communication unit 15 performs an operation in step S610. When the result of determination by the connection propriety determination unit 13 is the item (3) above, the communication unit 15 performs an operation in step S613.

In step S607, the connection propriety determination unit 13 of the mobile terminal 10 sends to the UI display unit 14 a request of displaying a screen ("unconnectable" screen of FIG. 10B)) which indicates that the mobile terminal 10 and the image forming apparatus 20 are unconnectable with each other.

After the request of displaying an "unconnectable" screen is received, in step S608, the UI display unit 14 of the mobile terminal 10 generates an "unconnectable" screen and displays the "unconnectable" screen on the display device 102. Hence, the user is notified that the mobile terminal 10 operated by the user cannot communicate with the image forming apparatus 20.

In step S609, the connection propriety determination unit 13 of the mobile terminal 10 sends a request of execution of a print job to the first communication unit 151.

After the request of execution of the print job is received, in step S610, the first communication unit 151 of the mobile terminal 10 sends the request of execution of the print job to the image forming apparatus 20. Namely, the mobile terminal 10 sends the print job to the image forming apparatus 20 via the network N1 (the in-company LAN connected via the wireless LAN).

After the print job is received from the mobile terminal 10, in step S611, the print function unit 21 of the image forming apparatus 20 executes the print job and outputs a copy of the printing target data. Hence, the user can obtain a copy of the printing target data printed out by the image forming apparatus 20.

In step S612, the connection propriety determination unit 13 of the mobile terminal 10 sends a request of execution of a print job to the second communication unit 152.

After the request of execution of the print job is received, in step S613, the second communication unit 152 of the mobile terminal 10 sends the request of execution of the print job to the image forming apparatus 20. Namely, the mobile terminal 10 sends the print job to the image forming apparatus 20 via the network N2 (P2P communication in Wi-Fi direct mode).

After the print job is received from the mobile terminal 10, in step S614, the print function unit 21 of the image forming apparatus 20 executes the print job and outputs a copy of the printing target data. Hence, the user can obtain a copy of the printing target data printed out by the image forming apparatus 20.

As described above, in the printing system 1 according to the first embodiment, the mobile terminal 10 acquires two or more communication information items for communicating with the image forming apparatus 20 from the information medium 30. The mobile terminal 10 is able to execute the print job on the image forming apparatus 20 by communicating with the image forming apparatus 20 based on one of the two or more communication information items acquired. Namely, the mobile terminal 10 is able to select one of the two or more networks by which the mobile terminal 10 is connectable with the image forming apparatus 20, and able to execute the print job by transmitting the print job to the image forming apparatus 20 via the selected network.

Next, the connection propriety determination process at step S608 of the above-described print job is described with reference to FIGS. 8-10. The connection propriety determination process is a process which determines which of the two networks N1 and N2 is to be selected for communication with the image forming apparatus 20 based on the first communication information 1100 and the second communication information 1300 included in the communication information 1000 acquired by the information acquisition unit 12. In other words, the connection propriety determination process selects one of the two or more networks for communication with the image forming apparatus 20.

Figure 8:
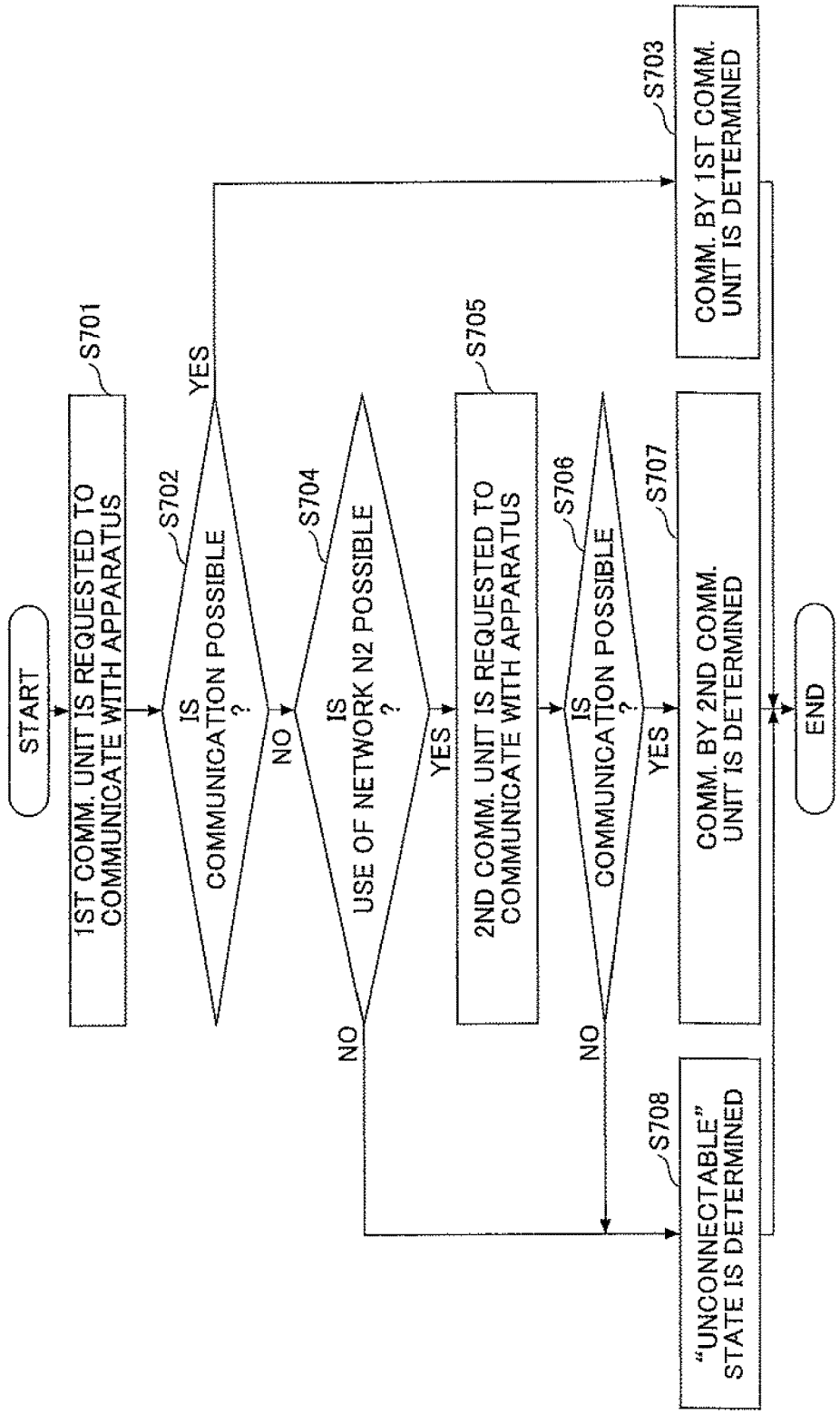
FIG. 8 is a flowchart for explaining a connection propriety determination process.

FIG. 8 is a flowchart for explaining the connection propriety determination process performed by the printing system according to the first embodiment. FIGS. 9A-10B are diagrams showing examples of screens of an application displayed on the display device 102 of the mobile terminal 10. The flow of the connection propriety determination process of FIG. 8 is described with reference to FIGS. 9 and 10.

Figure 9A:
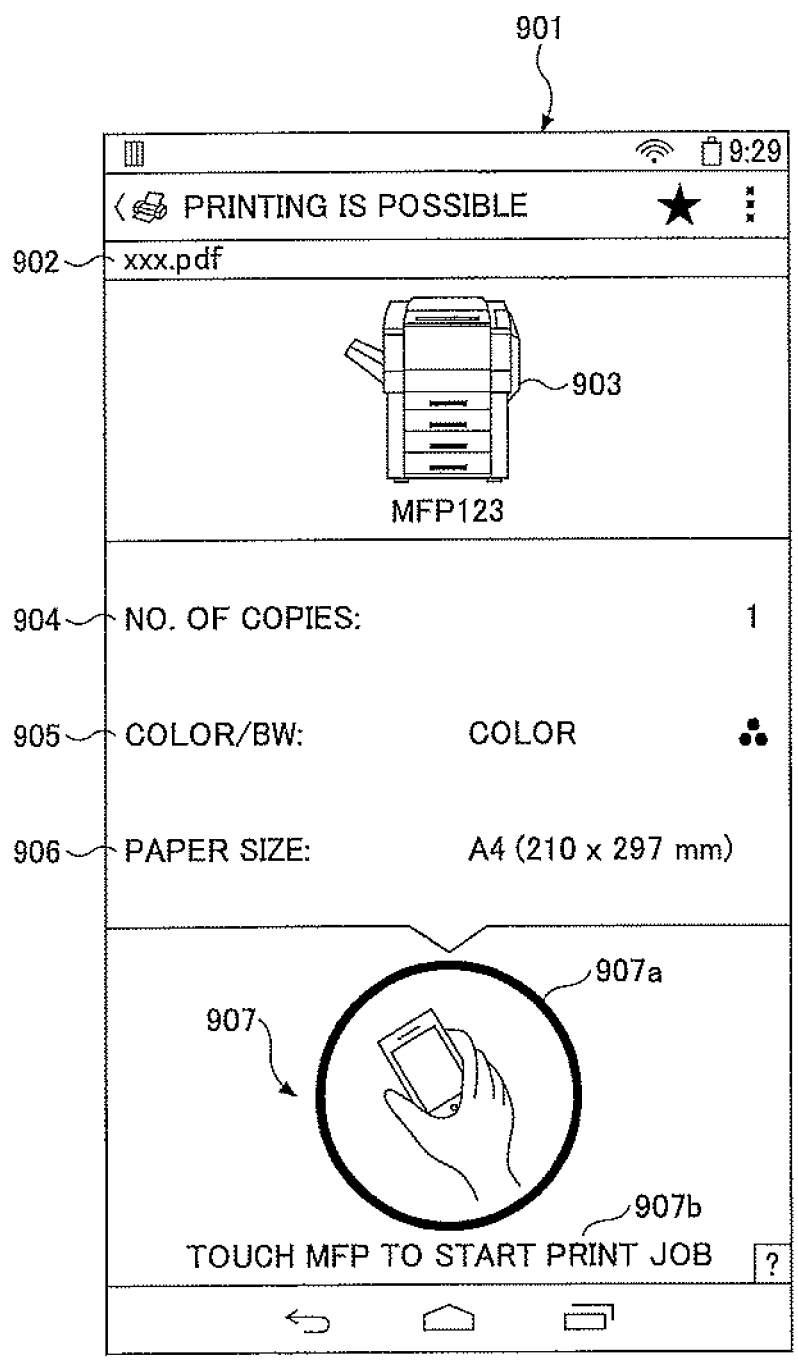
FIG. 9A and FIG. 9B are diagrams showing examples of screens displayed on a display device of the mobile terminal.

First, the user selects printing target data from a list of printing data displayed on the display device 102 by the application. After the printing target data is selected, a printing-conditions screen 901 as shown in FIG. 9A is displayed on the display device 102 of the mobile terminal 10. A printing target data name 902, an icon 903 of the image forming apparatus 20, a number-of-copies option 904, a COLOR/BW (black and white) option 905, and a paper size option 906 are displayed in the printing-conditions screen 901. Default setting values of the number-of-copies option 904, the COLOR/BW option 905, and the paper size option 906, which are set up beforehand by the application, are initially displayed, and the setting values which are finally set up by the user are kept. Hence, when sending a request for a print job to the image forming apparatus 20 using the mobile terminal 10, the user can perform the print job with the desired setting values (the printing conditions) by minimizing changes to the setting items.

In addition, a usage suggestion 907 including an icon 907a and a message 907b indicating "touch MFP to start print job" may be displayed, which prompts the user to hold the mobile terminal 10 over the NFC device 301 (NFC chip) of the image forming apparatus 20. After the mobile terminal 10 is held over the NFC device 301, the information acquisition unit 12 of the mobile terminal 10 acquires the communication information 1000 from the information medium 30. The connection propriety determination process of FIG. 8 is started upon acquisition of the communication information 1000 by the information acquisition unit 12.

As shown in FIG. 8, in step S701, the connection propriety determination unit 13 of the mobile terminal 10 sends to the first communication unit 151 a request of communication with the image forming apparatus 20 via the network N1, based on the first communication information 1100 included in the communication information 1000. Then, the first communication unit 151 attempts to communicate with the image forming apparatus 20 using the first communication information 1100. Here, the mobile terminal 10 attempts to connect with an IP address indicated by the communication information 1100 by preferentially using the currently connected network. Even if the user is an employee and the mobile terminal 10 carried by the user stores the information for connecting with an in-company LAN, priority is given to the currently connected network. When the mobile terminal 10 is currently connected with a different network (e.g., LTE, 3G, public wireless LAN, etc.), the acquired communication information 1100 does not include the information for identifying the network, such as SSID, and the mobile terminal 10 cannot determine whether the currently connected network is to be switched to the in-company LAN. Hence, in such a case, the mobile terminal 10 attempts to communicate with the image forming apparatus 20 via the different network, without being switched to the in-company LAN. The first communication unit 151 attempts to communicate with the apparatus (in this example, the image forming apparatus 20) indicated by the first IP address included in the first communication information 1100 via the currently connected network. Hence, in a case of the mobile terminal 10 currently connected with 3G or LTE, the communication with the apparatus indicated by the first IP address may be attempted via a base station of the carrier.

Figure 9B:
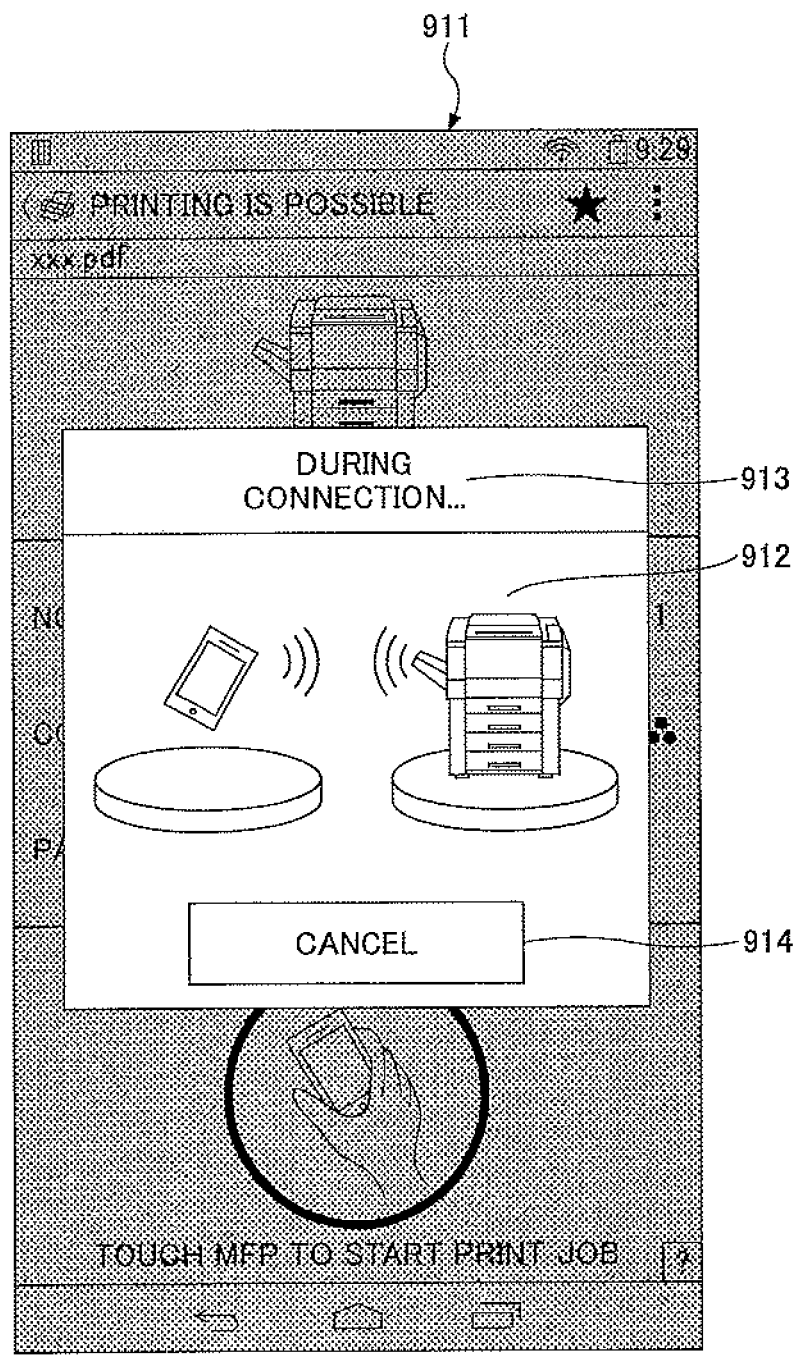

When the first communication unit 151 has attempted to communicate with the image forming apparatus 20, a during-connection screen 911 as shown in FIG. 9B is displayed on the display device 102 of the mobile terminal 10. In the during-connection screen 911, an icon 912 and a message 913 are displayed to show that connection of the mobile terminal 10 with the image forming apparatus 20 is under way. Moreover, a CANCEL button 914 is displayed for the user to stop the connection or the print job.

Referring back to FIG. 8, in step S702, the connection propriety determination unit 13 determines whether the mobile terminal 10 has successfully communicated with the image forming apparatus 20 via the network N1 based on the result of the communication by the first communication unit 151. When the communication with the image forming apparatus 20 via the network N1 is possible, the process progresses to step S703. On the other hand, when the communication is impossible, the process progresses to step S704.

Here, a description will be given of how the connection propriety determination unit 13 determines whether the communication with the image forming apparatus 20 is possible by using the first communication information 1100. For the sake of convenience, the method of the connection propriety determination will be described with respect to each of the use cases 1 and 2 described above.

Use Case 1:

The mobile terminal 10 attempts to connect with the image forming apparatus 20, regardless of whether the mobile terminal 10 is disconnected or connected with a certain network, and performs one of the following processes (1) to (3).

(1) The first communication unit 151 attempts to acquire MIS (management information base) information of the image forming apparatus 20 via the currently connected network. When the MIS information can be acquired, it is determined that the mobile terminal 10 has successfully communicated with the image forming apparatus 20. When the MIB information cannot be acquired, it is determined that the mobile terminal 10 has not communicated with the image forming apparatus 20. The MIB information may be standard MIB or extended MIB. If the standard MIB can be acquired, it is determined that at least data communication between the mobile terminal 10 and a certain apparatus (which is possibly the image forming apparatus 20) is possible. If the extended MIB can be acquired, it is determined that data communication between the mobile terminal 10 and the image forming apparatus 20 which is assumed by the application of the mobile terminal 10 (the application is configured by assuming a specific manufacturer or a specific model of the image forming apparatus 20) is possible. Even when the MIB information can be acquired, it may be determined that the mobile terminal 10 has not communicated with the image forming apparatus 20 if device information included in the acquired MIB information is inconsistent with device information of the image forming apparatus 20 as the communication partner (which device information is included, for example, in the communication information 1000 acquired from the information medium 30). In this manner, the connection propriety determination unit 13 can certainly determine that the mobile terminal 10 has communicated with the image forming apparatus 20 including the information medium 30 from which the communication information 1000 is read. Here, the device information is information that uniquely identifies the image forming apparatus 20, such as a manufacturing unique number (serial number) of the image forming apparatus 20, or an MAC (media access control) address.

(2) The first communication unit 151 attempts to acquire device information via the currently connected network by using a web API (application programming interface) provided by the image forming apparatus 20. The web API may be a programmatic interface to perform processing between an apparatus A and an apparatus B through a network (processing request method, data specification method, etc.). The web API is stored beforehand in the information storage unit 16 of the mobile terminal 10. When the device information can be acquired, it is determined that the mobile terminal 10 has communicated with the image forming apparatus 20. On the other hand, when the device information cannot be acquired, it is determined that the mobile terminal 10 has not communicated with the image forming apparatus 20. Namely, when the web API is not unique to the manufacturer of the image forming apparatus 20, it is determined that at least data communication between the mobile terminal 10 and a certain apparatus (which is possibly the image forming apparatus 20) is possible. When the web API is unique to the manufacturer of the image forming apparatus 20, it is determined that data communication between the mobile terminal 10 and the image forming apparatus 20 which is assumed by the application of the mobile terminal 10 is possible because the device information can be acquired. Even when the device information can be acquired, it may be determined that the mobile terminal 10 has not communicated with the image forming apparatus 20 if the acquired device information is inconsistent with device information of the desired image forming apparatus 20. In this manner, the connection propriety determination unit 13 can certainly determine that the mobile terminal 10 has communicated with the image forming apparatus 20 including the information medium 30 from which the communication information 1000 is read.

(3) The first communication unit 151 attempts to acquire an MAC address of the image forming apparatus 20 via the currently connected network by ARP (address resolution protocol). When the MAC address can be acquired, it is determined that the mobile terminal 10 has communicated with the image forming apparatus 20. On the other hand, when the MAC address cannot be acquired, it is determined that the mobile terminal 10 has not communicated with the image forming apparatus 20. If the MAC address can be acquired, an apparatus indicated by the IP address stored in the information medium 30 (which apparatus is possibly the image forming apparatus 20) exists, and it can be determined with high accuracy that data communication between the mobile terminal 10 and the image forming apparatus 20 including the information medium 30 has been performed. Even when the MAC address can be acquired, it may be determined that the mobile terminal 10 has not communicated with the image forming apparatus 20 if the acquired MAC address is inconsistent with an MAC address of the image forming apparatus 20 (which MAC address is acquired from the information medium 30). In this manner, the connection propriety determination unit 13 can certainly determine that the mobile terminal 10 has communicated with the image forming apparatus 20 in which the information medium 30 is provided.

If a communication error or the like occurs when performing one of the above processes (1) to (3), the first communication unit 151 may be requested to retry the corresponding process. Alternatively, if it is determined by performing one of the above processes (1) to (3) that the mobile terminal 10 has not communicated with the image forming apparatus 20, it may be finally determined by one attempt that the communication is impossible.

The performance of one of the processes (1) to (3) enables the determination that the mobile terminal 10 is disconnected, or the mobile terminal 10 is connected with another wireless LAN (a public wireless LAN), or the mobile terminal 10 is possibly connected with LTE or 3G. In this manner, it can be determined that the mobile terminal 10 cannot communicate with the image forming apparatus 20, by using the first communication information 1100.

When the mobile terminal 10 is not connected with any network, the mobile terminal 10 may detect through the OS that the mobile terminal 10 is not connected with a wireless LAN or disconnected from any other network, and it may be determined by using the first communication information 1100 that the mobile terminal 10 cannot communicate with the image forming apparatus 20. When it is detected that the mobile terminal 10 is connected with LTE or 3G, the determination may be made in a similar manner.

Moreover, when the mobile terminal 10 is not connected with any network, the mobile terminal 10 is currently not connected with the in-company LAN, and by using the first communication information 1100, it can be determined that the mobile terminal 10 cannot communicate with the image forming apparatus 20. It can be determined by using the first communication information 1100 that the mobile terminal 10 cannot communicate with the image forming apparatus 20, without performing any of the processes (1) to (3).

Use Case 2:

It can be understood that, in many cases in which the mobile terminal 10 of the employee 8 is connected with the in-company LAN, the mobile terminal 10 can communicate with the image forming apparatus 20 by using the first communication information 1100.

On the other hand, when the mobile terminal 10 of the employee 8 is not connected with the in-company LAN, the mobile terminal 10 cannot connect with the image forming apparatus 20 by using the first communication information 1100. When the mobile terminal 10 attempts to communicate with the image forming apparatus via the currently connected network which is different from the in-company LAN, such as LTE or 3G, there may be the following situations.

(i) A certain apparatus exists at an IP address indicated by the first communication information in the accidentally connected network (which apparatus may or may not be the image forming apparatus 20). In this situation, connection of the mobile terminal 10 with the apparatus is possible, but the mobile terminal 10 is not necessarily connected with the desired image forming apparatus 20, and sending a print job request to the apparatus may become meaningless.

(ii) No apparatus exists in an IP address indicated by the first communication information 1100 in the accidentally connected network.

Hence, in order to certainly determine that the mobile terminal 10 is in a state different from the above situations (i) and (ii) and has communicated with the image forming apparatus 20, the mobile terminal 10 performs one of the above-described processes (1) to (3). Thereby, the mobile terminal 10 can determine whether the apparatus with which the mobile terminal 10 is connected is the image forming apparatus 20 to which a print job request can be sent (or determine whether the mobile terminal 10 is connected with the image forming apparatus 20 via the network N1).

In the use case 2, even when the mobile terminal 10 is connected with the in-company LAN (the network N1), there may be cases in which a packet transmitted by the mobile terminal 10 of the employee 8 cannot reach the image forming apparatus 20. For example, in some case, a power supply of a router in a communication path from the access point 7 nearest to the mobile terminal 10 to the image forming apparatus 20 may be turned OFF, and in another case, a changed IP address of the image forming apparatus 20 may not be reflected in the information medium 30.

In these cases, when a timeout or a communication error (in HTTP protocol, the status code of 400 is returned) is detected during the performance of one of the processes (1) to (3), the connection propriety determination unit 13 determines that the communication of the mobile terminal 10 with the image forming apparatus 20 using the first communication information 1100 is impossible.

When the communication between the mobile terminal 10 and the image forming apparatus 20 via the network N1 is possible, in step S703, the connection propriety determination unit 13 of the mobile terminal 10 determines that the first communication unit 151 can communicate with the image forming apparatus 20 via the network N1 based on the first communication information 1100 included in the communication information 1000.

Figure 10A:
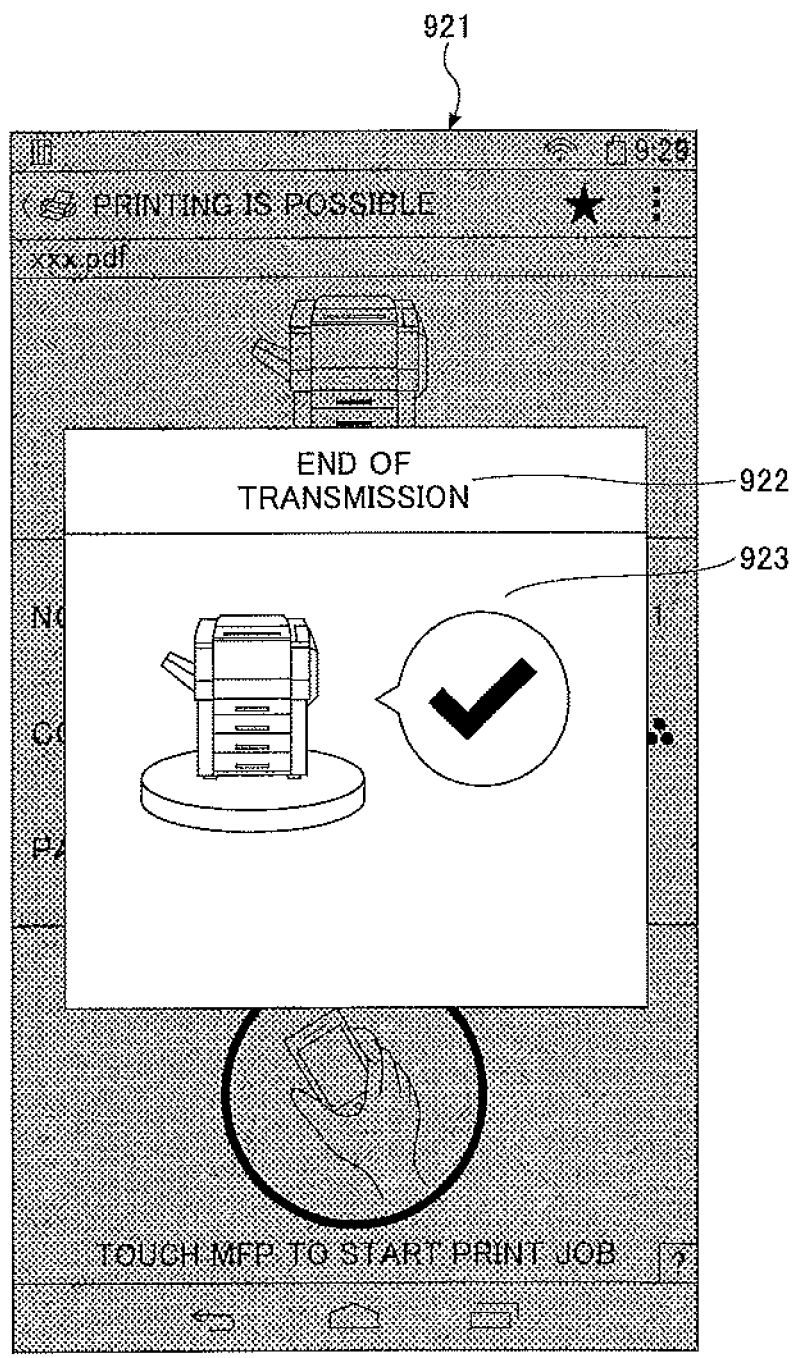
FIG. 10A and FIG. 10B are diagrams showing examples of screens displayed on the display device of the mobile terminal.

In this case, an end-of-transmission screen 921 as shown in FIG. 10A is displayed on the display device 102 of the mobile terminal 10. The end-of-transmission screen 921 is a screen indicating that transmission of a print job from the mobile terminal 10 to the image forming apparatus 20 is completed. In the end-of-transmission screen 921, an icon 923 indicating the completion of the transmission of the print job and a message 922 indicating "END OF TRANSMISSION" are displayed. After the end-of-transmission screen 921 is displayed for a predetermined period of time, the screen 921 automatically disappears and the printing-conditions screen 901 of FIG. 9A appears again. Alternatively, the printing-conditions screen 901 of FIG. 9A may be displayed when the user presses or touches the icon 923.

Referring back to FIG. 8, in step S704, the connection propriety determination unit 13 of the mobile terminal 10 determines whether use of the network N2 is possible by making reference to the use propriety information 1200 included in the communication information 1000. When the use of the network N2 is possible, the process progresses to step S705. When the use of the network N2 is impossible, the process progresses to step S708.

Hence, even when the mobile terminal 10 and the image forming apparatus 20 are directly connectable with each other via the network N2 by P2P communication in Wi-Fi direct mode, it can be determined whether connection of the mobile terminal 10 with the image forming apparatus 20 by P2P communication is permitted. Generally, the security level of the connection by P2P communication is lower than that of the connection via the in-company LAN using the wireless LAN. It is preferred that, when the mobile terminal 10 of the employee 8 cannot connect with the network N1, the employee 8 can be prevented from using the connection by P2P communication even if it is a temporary use. In this manner, increased security can be provided by making the determination at step S704.

In step S705, the connection propriety determination unit 13 of the mobile terminal 10 requests the second communication unit 152 to communicate with the image forming apparatus 20 via the network N2 based on the second communication information 1300 included in the communication information 1000. Then, the second communication unit 152 attempts to communicate with the image forming apparatus 20 via the network N2 based on the second communication information 1300. Namely, the second communication unit 152 attempts to communicate with the image forming apparatus 20 indicated by the second IP address included in the second communication information 1300.

In step S706, the connection propriety determination unit 13 determines whether the mobile terminal 10 has successfully communicated with the image forming apparatus 20 via the network N2, based on the result of the communication by the second communication unit 152. When the communication with the image forming apparatus 20 via the network N2 is possible, the process progresses to step S707. When the communication is impossible, the process progresses to step S708. During the determination at step S706, the during-connection screen of FIG. 9B is continuously displayed.

Here, a description will be given of how the connection propriety determination unit 13 determines whether the communication with the image forming apparatus 20 is possible, using the second communication information 1300. The determination at step S706 is made in the same manner for each of the use cases 1 and 2.

It can be understood that both the mobile terminal 10 of the visitor 9 and the mobile terminal 10 of the employee 8 are capable of transmitting a packet to and receiving a packet from the image forming apparatus 20 using the second communication information 1300. Hence, the connection propriety determination unit 13 can determine whether the communication with the image forming apparatus 20 is possible, by performing one of the processes (1) to (3) described above at step S702.

Although it is rare, there may be cases in which the mobile terminal 10 cannot transmit a packet to or receive a packet from the image forming apparatus 20 via the network N2. For example, in some case, the power supply may be turned OFF and no power is supplied to the communication interface 204 of the image forming apparatus 20, or in another case, the communication interface 204 may malfunction to cause poor communication. In these cases, when no response from the image forming apparatus 20 can be obtained, or a timeout or a communication error is detected during the performance of one of the processes (1) to (3), the connection propriety determination unit 13 determines that the communication with the image forming apparatus 20 using the second communication information 1300 is impossible.

When the communication with the image forming apparatus 20 via the network N2 is possible, in step S707, the connection propriety determination unit 13 of the mobile terminal 10 determines that the second communication unit 152 can communicate with the image forming apparatus 20 via the network N2 based on the second communication information 1300 included in the communication information 1000.

In this case, the end-of-transmission screen 921 of FIG. 10A is displayed on the display device 102 of the mobile terminal 10. Namely, the same screen is displayed, regardless of whether a print job is transmitted via the network N1 or via the network N2, and the user does not need to be conscious of the different networks. A screen indicating whether the network N1 or the network N2 via which the mobile terminal 10 has transmitted the print job may be displayed on the display device 102. In this manner, the user as the employee 8 can check whether he has used the in-company LAN with increased security and the user as the visitor 9 can check whether his print job has been transmitted via the network by P2P communication.

Referring back to FIG. 8, when the communication with the image forming apparatus 20 via each of the network N1 and the network N2 is impossible, in step S708, the connection propriety determination unit 13 determines that the mobile terminal 10 cannot communicate with the image forming apparatus 20.

Figure 10B:
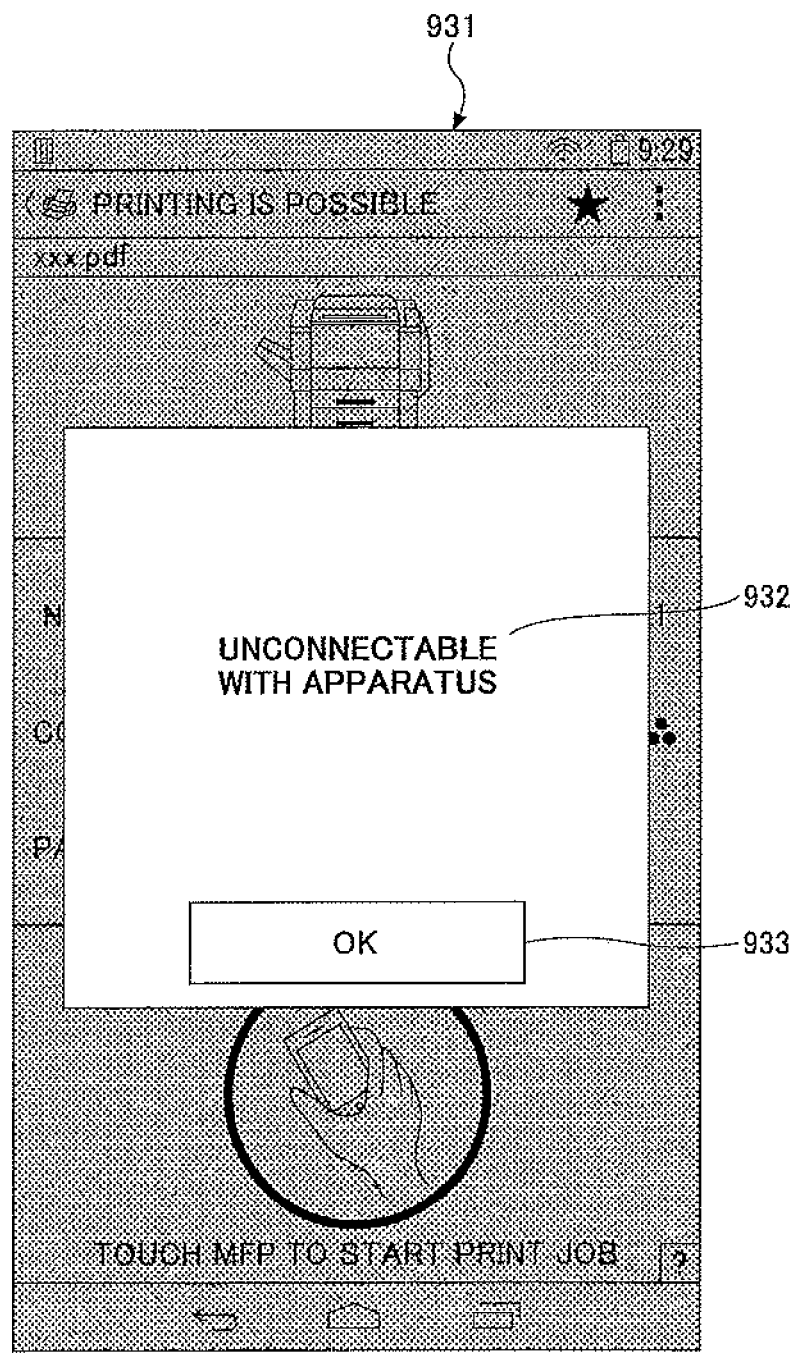

In this case, an "unconnectable" screen 931 as shown in FIG. 10B is displayed on the display device 102 of the mobile terminal 10. In the "unconnectable" screen 931, a message 932 indicating "UNCONNECTABLE WITH APPARATUS" and an OK button 933 are displayed. The printing-conditions screen 901 of FIG. 9A may be displayed on the display device 102 when the user presses or touches the OK button 933.

As described in the process of FIG. 8, the printing system 1 according to the first embodiment can reduce the labor of the users to set up the first communication information 1100 and the second communication information 1300 to the image forming apparatus 20 connected to two or more networks, and can automatically select an appropriate one of the networks for each of the users.

In step S701 of the above-described process, the connection propriety determination unit 13 attempts to communicate with the image forming apparatus 20 using the first communication information 1100, and in step S705 attempts to communicate with the image forming apparatus 20 using the second communication information 1300. Namely, the sequence in which one of the first communication information 1100 and the second communication information 1300 is selected for the communication is fixed and determined by the order in which the communication information items were registered in the communication information 1000 of FIG. 6 (or by the increasing order of address).

However, the sequence in which the connection propriety determination unit 13 attempts to perform communication is not limited to this example. Alternatively, in step S701, the communication using the second communication information 1300 may be attempted, and in step S705, the communication using the first communication information 1100 may be attempted.

Moreover, the sequence in which one of the plural networks is selected for the mobile terminal 10 (the connection propriety determination unit 13) to attempt to communicate with the image forming apparatus 20 via the selected network may be determined according to an ordered set of priority levels.

FIG. 11 is a diagram showing another example of the communication information 1000. In the communication information shown in FIG. 11, a priority level 1 is assigned to the first communication information 1100 of the network N1 among the plural networks, a priority level 3 is assigned to the use propriety information 1200 and the second communication information 1300 of the network N2, and a priority level 2 is assigned to use propriety information 1400 and third communication information 1500 of a network N3. When the priority levels of the respective networks (and the respective communication information items) are registered in the communication information 1000 in this way, the connection propriety determination unit 13 attempts to communicate with the image forming apparatus 20 via one of the networks which is selected in order of the first communication information 1100 (network N1), the third communication information 1500 (network N3), and the second communication information 1300 (network N2).

Figure 12:
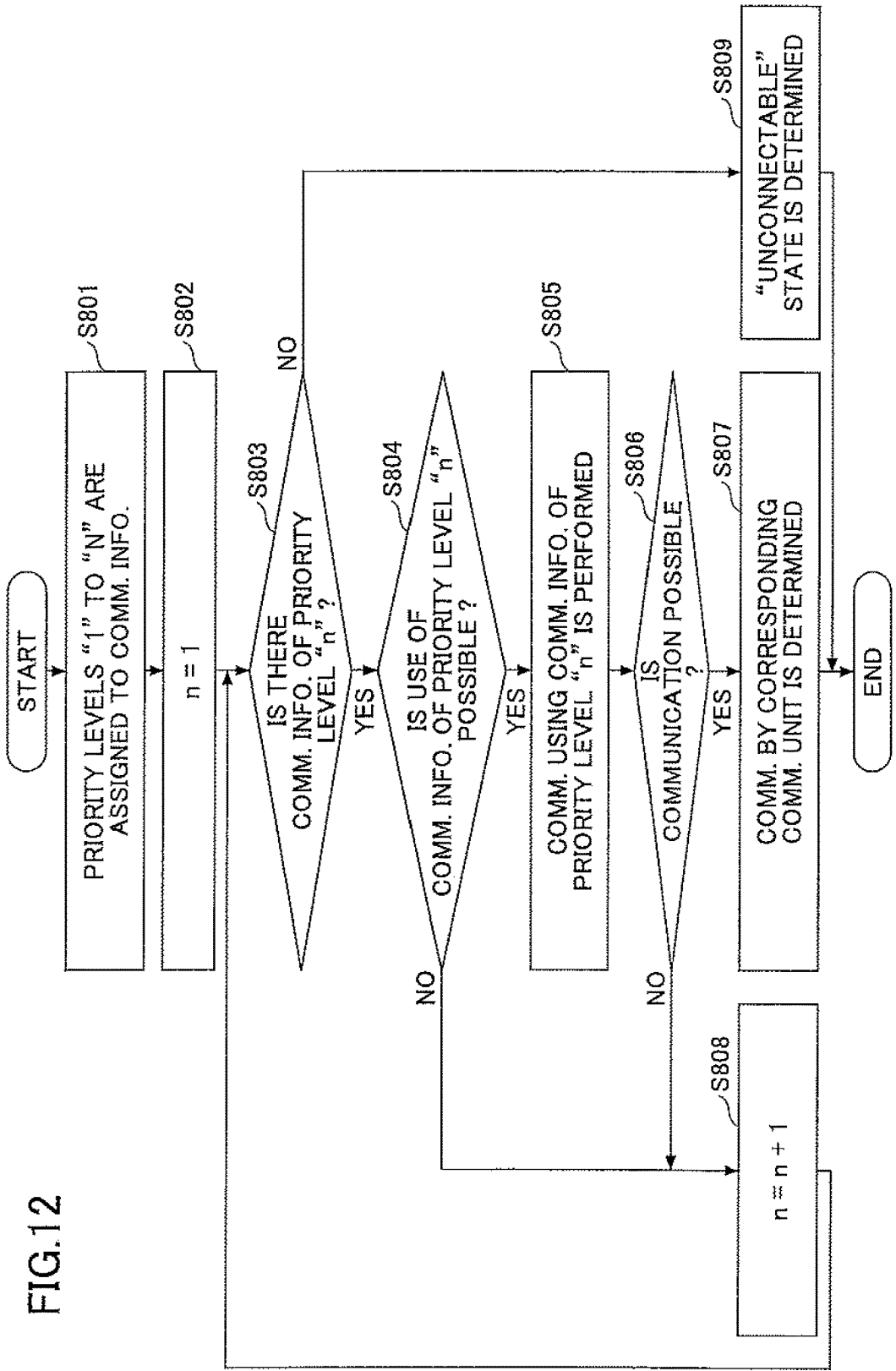
FIG. 12 is a flowchart for explaining a connection propriety determination process in the print job shown in FIG. 7.

FIG. 12 is a flowchart for explaining the connection propriety determination process at step S606 of FIG. 7 when the communication information 1000 of FIG. 11 is used.

In step S801, the connection propriety determination unit 13 of the mobile terminal 10 reads all the priority levels 1 to N of the first communication information 1100, the second communication information 1300 and the third communication information 1500, included in the communication information 1000, and assigns the priority levels 1 to N to the respective communication items in order of decreasing precedence. This is because there may be a case in which the priority levels of the communication information items included in the communication information 1000 are not started from 1, or they are not listed vertically in order of decreasing precedence. After the step S801 is performed, the consecutive priority levels 1 to N are assigned to the respective communication information items. When the same priority level is assigned to two or more of the respective communication information items, the consecutive priority levels may be assigned to them in the order in which the communication information items were registered in the communication information 1000 (or in increasing order of address).

In step S802, the connection propriety determination unit 13 sets "1" to a control variable n. Namely, the control variable n is initialized.

In step S803, the connection propriety determination unit 13 determines whether there is any communication information item (or any of the first through third communication information 1100, 1300 and 1500) to which the priority level n is assigned. When there is a communication information item of the priority level n, the process progresses to step S804. When there is no communication information item of the priority level n, the process progresses to step S809.

In step S809, the connection propriety determination unit 13 determines that the mobile terminal 10 is in an unconnectable state, because the communication is impossible although the connection propriety determination unit 13 has attempted to communicate with the image forming apparatus 20 using all of the communication information items included in the communication information 1000.

In step S804, the connection propriety determination unit 13 makes reference to the use propriety information 1200 or 1400 of the priority level n, and determines whether the communication information of the priority level n (any of the first communication information 1100, the second communication information 1300, or the third communication information 1500) can be used. When there is no use propriety information like the first communication information 1100, the connection propriety determination unit 13 may determine that the communication information can be used. Alternatively, the communication information 1000 may be configured to include the use propriety information for each of the first through third communication information 1100, 1300 and 1500. When the communication information of the priority level n can be used, the process progresses to step S805. When the communication information of the priority level n cannot be used, the process progresses to step S808.

In step S805, the connection propriety determination unit 13 attempts to communicate with the image forming apparatus 20 using the communication information of the priority level n.

In step S806, the connection propriety determination unit 13 determines whether the communication using the communication information of the priority level n is possible. Although the situations differ in the use cases 1 and 2, the determination as to whether the communication is possible may be made by a determination whether the connection with the access point 7 is possible, or by a determination based on the result of the performance of one of the processes (1) to (3) at step S702 or step S706 of FIG. 8, if it is feasible. When the communication is possible, the process progresses to step S807. When the communication is not possible, the process progresses to step S808.

In step S807, the connection propriety determination unit 13 determines that the communication unit 15 corresponding to the communication information of the priority level n can communicate with the image forming apparatus 20.

In step S808, the connection propriety determination unit 13 increments the control variable n by one (n=n+1). Then, the process of the step S803 and subsequent steps is repeated.

In step S809, the connection propriety determination unit 13 determines that the mobile terminal 10 is in an unconnectable state, because the communication is impossible although the connection propriety determination unit 13 has attempted to communicate with the image forming apparatus 20 using all of the communication information items included in the communication information 1000.

As described above, the mobile terminal 10 has the ordered set of the priority levels of the respective networks (and the respective communication information items) stored in the communication information 1000, and enables the user to communicate with the image forming apparatus 20 using an appropriate communication information item in the communication information 1000 which is to be used preferentially.

It is preferred that, when performing such a priority control, the priority level of the communication information item for connecting with the in-company LAN is higher than all the priority levels of the communication information items for connecting with the network of P2P communication. Thereby, the employee 8 can be preferentially connected with the in-company LAN and the visitor 9 can be connected with the network of P2P communication. However, even when the priority level of the communication information item for connecting with the network of P2P communication is higher than the priority level of the communication information item for connecting with the in-company LAN, both the employee 8 and the visitor 9 are capable of communicating with the image forming apparatus 20 via the network of P2P communication.

Moreover, such priority levels may be determined according to a communication band of each of the networks.

Moreover, the sequence in which one of the plural networks is selected for the mobile terminal 10 to attempt to communicate with the image forming apparatus 20 via the selected network may be determined based on an IP address of the mobile terminal 10 and an IP address of the image forming apparatus 20 included in the communication information 1000. For example, it is assumed that the IP address of the mobile terminal 10 is "192.160.0.3", the first IP address of the image forming apparatus 20 in the network N1 is "192.168.20.1", and the second IP address of the image forming apparatus 20 in the network N2 is "192.160.0.4." In this case, the mobile terminal 10 may preferentially attempt to perform the communication via the network N2 whose IP address has the same sub-network address portion "192.160.0.0" as that of the IP address of the mobile terminal 10, and thereafter the mobile terminal 10 may attempt to perform the communication via the network N1 (in this case, it is preferred that the network N2 is a network for employees).

In the IP-address control described above, when the mobile terminal 10 communicates with the image forming apparatus 20 via the network N2, the communication between the mobile terminal and the image forming apparatus 20 is performed via the selected network N2 whose IP address has the same sub-network address portion, and the increase in the network traffic can be prevented.

Accordingly, in the printing system 1 according to the first embodiment, the mobile terminal 10 acquires from the information medium 30 two or more communication information items for communicating with the image forming apparatus 20. The mobile terminal 10 can communicate with the image forming apparatus 20 via the network based on one of the acquired communication information items, and perform a print job on the image forming apparatus 20. The mobile terminal 10 selects one of the networks connected with the image forming apparatus 20, and can perform the print job on the image forming apparatus 20 by transmitting the print job from the mobile terminal 10 to the image forming apparatus 20 via the selected network. Therefore, even when the mobile terminal 10 cannot communicate with the image forming apparatus 20 via one of the plural networks, the user does not need to set anew in the mobile terminal 10 a communication information item for communicating with the image forming apparatus 20 via another network of the plural networks. Hence, the time and effort of the user and the management of the printing system 1 according to the first embodiment can be reduced.

The information acquisition unit 12 is an example of an acquisition unit in the claims. The connection propriety determination unit 13 is an example of a determination unit in the claims. The communication unit 15 is an example of a connection unit in the claims.

[Second Embodiment ]

In the foregoing embodiment, it has been described that the image forming apparatus 20 may be an image projection apparatus (projector). In the second embodiment, a case in which the image forming apparatus 20 is an image projection apparatus (projector) will be described.

In the following, the elements in the second embodiment which are essentially the same as corresponding elements in the first embodiment are designated by the same reference numerals, and a description thereof will be omitted. Hence, only the differences of the second embodiment from the first embodiment will be described.

Figure 13:
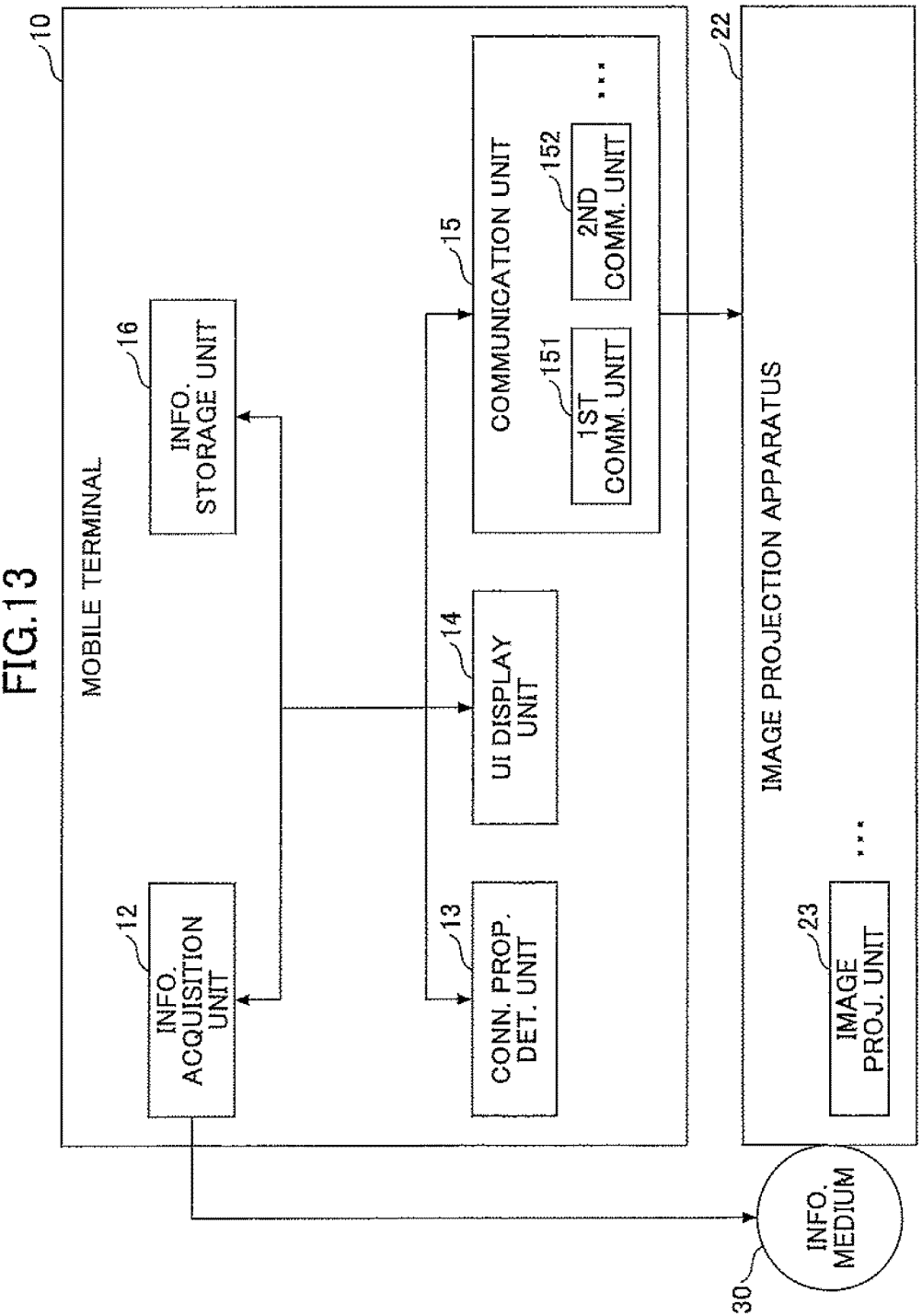
FIG. 13 is a block diagram showing a functional configuration of an image projection system according to a second embodiment.

FIG. 13 is a diagram showing a functional configuration of an image projection system according to the second embodiment. As shown in FIG. 13, the configuration of the mobile terminal 10 is the same as that of the first embodiment shown in FIG. 5. However, the mobile terminal 10 shown in FIG. 13 may communicate with an image projection apparatus 22, instead of the image forming apparatus 20 of the first embodiment shown in FIG. 5. The information medium 30 may be arranged in the image projection apparatus 22 or in a vicinity of the image projection apparatus 22 and the image projection apparatus 22 may include an image projection unit 23. The information medium 30 is the same as that of the first embodiment described above.

The image projection apparatus 22 modulates image data based on the known DLP (digital light processing) system or LCD (liquid crystal display) system, and projects an image on a screen, a wall, etc. The image data is transmitted from the mobile terminal 10 to the image projection apparatus 22 via the network N1 or N2. The image projection unit 23 generates a projection image from the image data by a projection engine based on the DLP system or the LCD system.

FIG. 14 is a sequence diagram for explaining an image projection process performed by the image projection system according to the second embodiment. Steps S601 to S608 in the process of FIG. 14 are essentially the same as corresponding steps in the process of FIG. 7, and therefore a description thereof will be omitted. Steps S609 to S614 in the process of FIG. 14 differ from corresponding steps in the process of FIG. 7, and therefore a description will be given of steps S609-S614 in the process of FIG. 14.

In step S609, the connection propriety determination unit 13 of the mobile terminal 10 sends an image projection request to the first communication unit 151.

After the image projection request is received, in step S610, the first communication unit 151 of the mobile terminal 10 sends the image projection request to the image projection apparatus 22. Namely, the mobile terminal 10 transmits the image projection request and image data to the image projection apparatus 22 via the network N1 (the in-company LAN connected via the wireless LAN). The image data is generated from an image which is currently displayed on the display device 102 of the mobile terminal 10 or selected by the user.

After the image projection request is received from the mobile terminal 10, in step S611, the image projection unit 23 of the image projection apparatus 22 projects the image on a screen, a wall, etc. Hence, the user can project a desired image by using the image projection apparatus 22.

In step S612, the connection propriety determination unit 13 of the mobile terminal 10 sends an image projection request to the second communication unit 152.

After the image projection request is received, in step S613, the second communication unit 152 of the mobile terminal 10 sends the image projection request to the image projection apparatus 22. Namely, the mobile terminal 10 transmits the image projection request and image data to the image projection apparatus 22 via the network N2 (P2P communication in Wi-Fi direct mode).

After the image projection request is received from the mobile terminal 10, in step S614, the image projection unit 23 of the image projection apparatus 22 projects the image on a screen, a wall, etc. Hence, the user can project a desired image by using the image projection apparatus 22.

When the mobile terminal 10 requests the image forming apparatus 20 to perform a print job, the mobile terminal 10, after the print job is sent to the image forming apparatus 20, may be set in a standby state until the end of the print job. On the other hand, when the mobile terminal 10 requests the image projection apparatus 22 to project images, the mobile terminal 10 is required to send image data to the image projection apparatus 22 for each of the images.

When a static image displayed on the display device 102 of the mobile terminal 10 is updated by a user (including an image change, a change of zooming, a change of a display range, etc.), or when a selected projection image is changed by a user, the mobile terminal 10 is required to transmit image data to the image projection apparatus 22. When moving images are displayed on the display device 102, the mobile terminal 10 is required to capture the moving images periodically, generate image data from the captured images, and transmit the image data to the image projection apparatus 22. The format of image data may be any of JPEG, TIFF, GIF, and PNG, which is consistent with that of the image projection apparatus 22.

Moreover, the mobile terminal 10 may transmit a file including image data to the image projection apparatus 22. Examples of the file may include a PDF file, an MPEG file, etc. In this case, the image projection apparatus 22 is required to open the received file, transform the image data into an image, and project the image.

As described above, in addition to the advantageous effects of the first embodiment, the image projection system according to the second embodiment can communicate with the mobile terminal 10 in a network appropriate for performing wireless communication, and transmit the necessary data including image data to the image projection apparatus.

As described in the foregoing, when transmitting a request to an apparatus connectable with plural networks, the information processing program product according to the present invention can transmit the request to the apparatus via a selected one of the networks without the need for a user to select one of the networks.

The information processing program product, the information processing apparatus and the information processing system according to the present invention are not limited to the above-described embodiments and various variations and modifications may be made without departing from the scope of the present invention.

The present application is based on and claims the benefit of priority of Japanese Patent Application No. 2014-130950, filed on Jun. 26, 2014, and Japanese Patent Application No. 2015-032198, filed on Feb. 20, 2015, the entire contents of which are incorporated herein by reference.

The invention claimed is:

1. An information processing system, comprising:
processing circuitry configured to
acquire communication information including first communication information for connecting with an image forming apparatus via a first network and second communication information for connecting with the image forming apparatus via a second network;
transmit a processing request to the image forming apparatus via the first network, using the first communication information, when determining that device information stored in the image forming apparatus was acquired, by using the first communication information; and
transmit the processing request to the image forming apparatus via the second network, using the second communication information, when not determining that the device information stored in the image forming apparatus was acquired by using the first communication information.

2. The information processing system according to claim 1, wherein the processing circuitry is further configured to
determine whether communication between an information processing apparatus and the image forming apparatus via the second network based on the second communication information is possible when the communication via the first network is determined as being impossible, and
connect the information processing apparatus with the image forming apparatus via the second network based on the second communication information when the communication via the second network is determined as being possible.

3. The information processing system according to claim 2, wherein the processing circuitry is further configured to
acquire one or more third communication information items for connecting with the image forming apparatus via a third network different from the first and second networks, and
connect an information processing apparatus with the image forming apparatus via the second network or via the third network based on the third communication information items when the communication via the first network is determined as being impossible.

4. The information processing system according to claim 2, wherein the processing circuitry is further configured to
determine whether the device information that uniquely identifies the image forming apparatus was acquired via the first network corresponding to the first communication information or via the second network corresponding to the second communication information, and
determine, when the device information is determined as having been acquired via one of the first network or the second network, that the communication between an information processing apparatus and the image forming apparatus via the one of the first network or the second network is possible.

5. The information processing system according to claim 4, wherein the device information includes a manufacturing unique number of the image forming apparatus, and the device information is included in management information base information which was acquired via the first network or the second network.

6. The information processing system according to claim 2, wherein the processing circuitry is further configured to
determine whether the device information that uniquely identifies the image forming apparatus was acquired via the first network corresponding to the first communication information or the second network corresponding to the second communication information according to a predetermined priority level, and
determine, when the device information is determined as having been acquired via one of the first network or the second network, that the communication between an information processing apparatus and the image forming apparatus via the one of the first network or the second network is possible.

7. The information processing system according to claim 1, wherein the processing circuitry is further configured to acquire plural communication information items for communication with the image forming apparatus, each corresponding to one of plural networks including the first network and the second network, by near-field communication (NFC), from an NFC tag provided on the image forming apparatus.

8. A method performed by processing circuitry included in an information processing system, the method comprising:
acquiring communication information including first communication information for connecting with an image forming apparatus via a first network and second communication information for connecting with the image forming apparatus via a second network;
transmitting a processing request to the image forming apparatus via the first network, using the first communication information, when determining that device information stored in the image forming apparatus was acquired by using the first communication information; and
transmitting the processing request to the image forming apparatus via the second network, using the second communication information, when not determining that the device information stored in the image forming apparatus was acquired by using the first communication information.

9. The method according to claim 8, further comprising:
determining whether communication between an information processing apparatus and the image forming apparatus via the second network based on the second communication information is possible when the communication via the first network is determined as being impossible, and
connecting the information processing apparatus with the image forming apparatus via the second network based on the second communication information when the communication via the second network is determined as being possible.

10. The method according to claim 9, further comprising:
acquiring one or more third communication information items for connecting with the image forming apparatus via a third network different from the first and second networks, and
connecting the information processing apparatus with the image forming apparatus via the second network or via the third network based on the third communication information items when the communication via the first network is determined as being impossible.

11. The method according to claim 9, further comprising:
determining whether the device information that uniquely identifies the image forming apparatus was acquired via the first network corresponding to the first communication information or the second network corresponding to the second communication information, and
determining, when the device information is determined as having been acquired via one of the first network or the second network, that the communication between the information processing apparatus and the image forming apparatus via the one of the first network or the second network is possible.

12. The method according to claim 11, wherein the device information includes a manufacturing unique number of the image forming apparatus, and the device information is included in management information base information which was acquired via the first network or the second network.

13. The method according to claim 9, further comprising:
determining whether the device information that uniquely identifies the image forming apparatus was acquired via the first network corresponding to the first communication information or via the second network corresponding to the second communication information according to a predetermined priority level, and
determining, when the device information is determined as having been acquired via one of the first network or the second network, that the communication between the information processing apparatus and the image forming apparatus via the one of the first network or the second network is possible.

14. The method according to claim 8, further comprising:
acquiring plural communication information items for communication with the image forming apparatus, each corresponding to one of plural networks including the first network and the second network, by near-field communication (NFC), from an NFC tag provided on the image forming apparatus.

15. An information processing apparatus, comprising:
processing circuitry configured to
acquire communication information including first communication information for connecting with an image forming apparatus via a first network and second communication information for connecting with the image forming apparatus via a second network;
transmit a processing request to the image forming apparatus via the first network, using the first communication information, when determining that device information stored in the image forming apparatus was acquired by using the first communication information; and transmit the processing request to the image forming apparatus via the second network, using the second communication information, when not determining that the device information stored in the image forming apparatus was acquired by using the first communication information.

16. An information processing system including an information processing apparatus and an image forming apparatus, the system comprising:

processing circuitry configured to acquire communication information including first communication information for connecting with the image forming apparatus via a first network and second communication information for connecting with the image forming apparatus via a second network;

transmit a processing request to the image forming apparatus via the first network, using the first communication information, when device information stored in the image forming apparatus was acquired by using the first communication information; and transmit the processing request to the image forming apparatus via the second network, using the second communication information, when it is not determined that the device information stored in the image forming apparatus was acquired by using the first communication information.

17. An image forming apparatus, comprising:

processing circuitry configured to send device information stored in the image forming apparatus to an information processing apparatus in response to receiving a request from the information processing apparatus via a first network, receive a processing request from the information processing apparatus via the first network, when the device information has been sent to the information processing apparatus in response to receiving the request from the information processing apparatus via the first network, receive the processing request from the information processing apparatus via a second network, when the device information has not been sent to the information processing apparatus in response to receiving the request from the information processing apparatus via the first network, and perform an image forming process based on the processing request received from the information processing apparatus.

* * * * *